US010271365B2

(12) United States Patent
Nguyen

(10) Patent No.: US 10,271,365 B2
(45) Date of Patent: Apr. 23, 2019

(54) METHOD AND SYSTEM FOR DEVICE TO DEVICE COMMUNICATION

(71) Applicant: NEC CORPORATION, Tokyo (JP)

(72) Inventor: Phong Nguyen, Victoria (AU)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/548,007

(22) PCT Filed: Feb. 9, 2016

(86) PCT No.: PCT/JP2016/000668
§ 371 (c)(1),
(2) Date: Aug. 1, 2017

(87) PCT Pub. No.: WO2016/129269
PCT Pub. Date: Aug. 18, 2016

(65) Prior Publication Data
US 2018/0249518 A1    Aug. 30, 2018

(30) Foreign Application Priority Data

Feb. 12, 2015   (AU) ................................ 2015900449

(51) Int. Cl.
| H04L 12/801 | (2013.01) |
| H04B 1/50 | (2006.01) |
| H04J 3/17 | (2006.01) |
| H04W 76/14 | (2018.01) |
| H04W 4/10 | (2009.01) |
| H04W 72/04 | (2009.01) |
| H04W 72/12 | (2009.01) |

(52) U.S. Cl.
CPC ............ *H04W 76/14* (2018.02); *H04W 4/10* (2013.01); *H04W 72/0446* (2013.01); *H04W 72/0453* (2013.01); *H04W 72/1278* (2013.01)

(58) Field of Classification Search
CPC combination set(s) only.
See application file for complete search history.

(56) References Cited

U.S. PATENT DOCUMENTS

| 7,119,676 B1* | 10/2006 | Silverstrim | ............ G01D 21/00 |
| | | | 340/531 |
| 2013/0322413 A1* | 12/2013 | Pelletier | ............ H04W 72/1289 |
| | | | 370/336 |
| 2015/0126208 A1* | 5/2015 | Yu | ......................... H04W 4/023 |
| | | | 455/452.1 |

(Continued)

OTHER PUBLICATIONS

"Status Report to TSG 1 Work plan related evaluation", 3GPP TSG RAN meeting #66, Draft RP-141894, Maui, USA, Dec. 8-11, 2014, pp. 1/3-38/3, XP050899383.

(Continued)

*Primary Examiner* — Faruk Hamza
*Assistant Examiner* — Abusayeed M Haque
(74) *Attorney, Agent, or Firm* — Sughrue Mion, PLLC

(57) ABSTRACT

A method and system for device-to-device (D2D) communication off-network is provided. The method includes providing, from a first D2D-UE to at least one second D2D-UE, a scheduling assignment (SA) providing, from between the first D2D-UE to the at least one second D2D-UE, MAC-PDU data according to the scheduling assignment.

18 Claims, 21 Drawing Sheets

(56) References Cited

U.S. PATENT DOCUMENTS

| | | | | |
|---|---|---|---|---|
| 2015/0128537 A1* | 5/2015 | Spindler | ............... | B65B 49/02 |
| | | | | 53/564 |
| 2015/0156783 A1* | 6/2015 | Klang | ............... | H04W 72/082 |
| | | | | 455/436 |
| 2015/0358800 A1* | 12/2015 | Park | ............... | H04W 8/005 |
| | | | | 370/311 |
| 2015/0382341 A1* | 12/2015 | Li | ............... | H04W 74/06 |
| | | | | 370/329 |
| 2016/0094398 A1* | 3/2016 | Choudhury | ............ | H04L 45/42 |
| | | | | 370/254 |
| 2016/0183276 A1* | 6/2016 | Marinier | ............... | H04W 72/02 |
| | | | | 370/329 |
| 2016/0219541 A1* | 7/2016 | Chatterjee | ............. | H04W 76/18 |
| 2016/0337936 A1* | 11/2016 | Li | ............... | H04W 40/04 |
| 2017/0127471 A1* | 5/2017 | Yu | ............... | H04W 76/30 |

OTHER PUBLICATIONS

"Draft Terms of Reference for TSG SA WG6", 3GPP Draft; SP-140645, Maui, USA, Dec. 10-12, 2014, 1 page, XP050931330.

3GPP TS 22.179 V13.0.1, "3rd Generation Partnership Project; Technical Specification Group Services and System Aspects; Mission Critical Push to Talk (MCPTT) over LTE, Stage 1 (Release 13)", Jan. 2015, pp. 1-74, XP050941007.

International Search Report for PCT/JP2016/000668 dated Sep. 6, 2016 [PCT/ISA/210].

\* cited by examiner

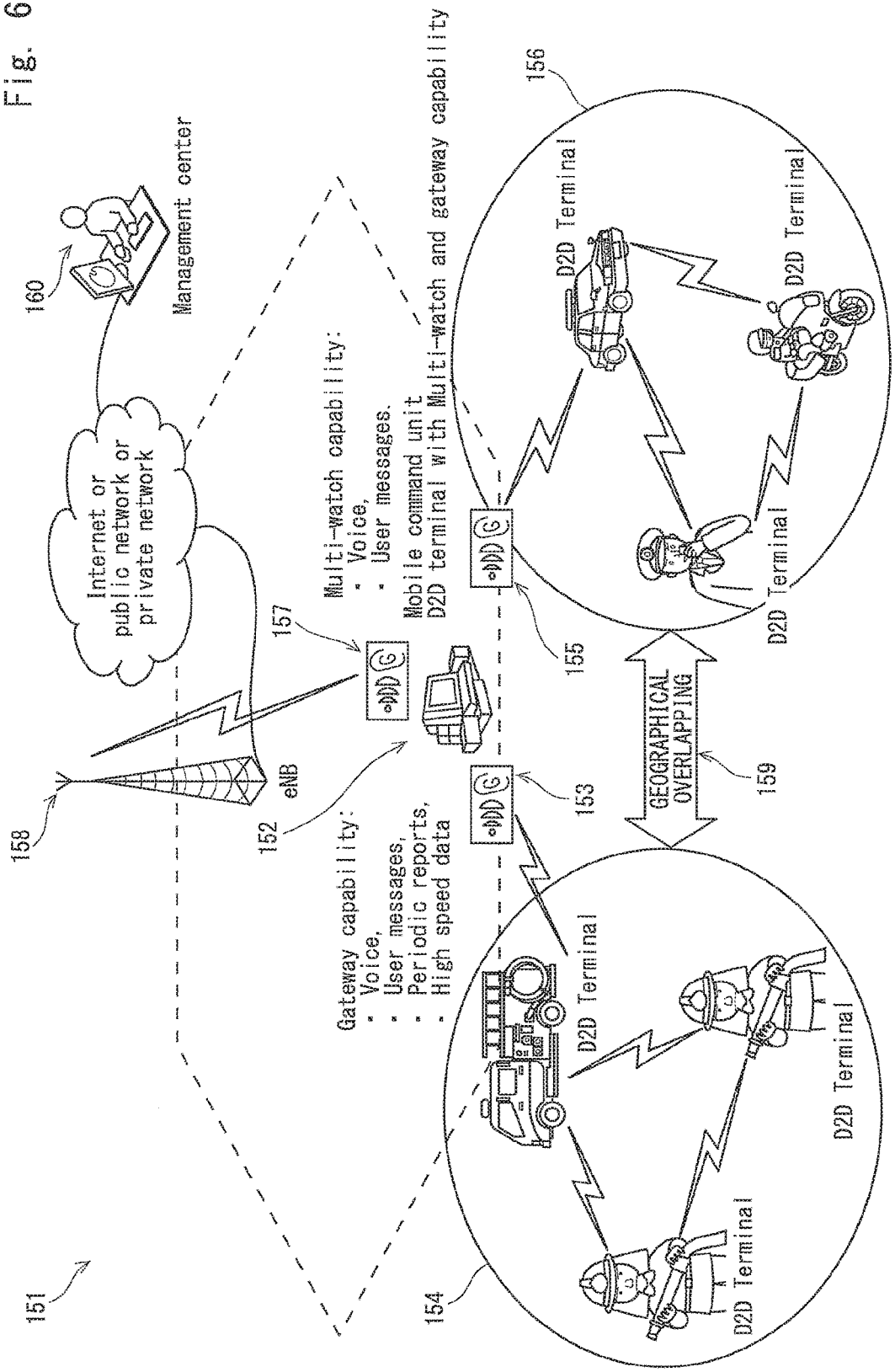

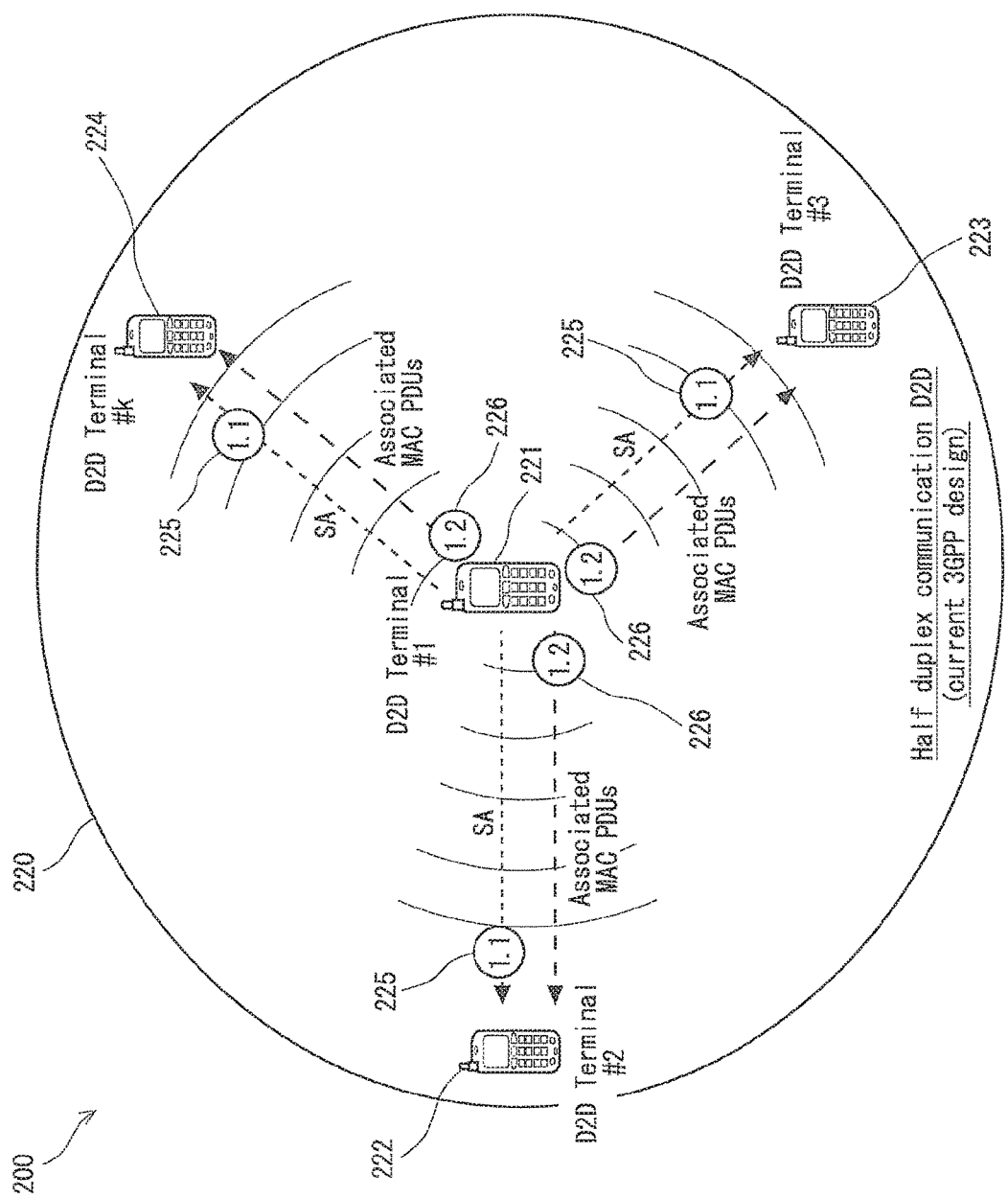

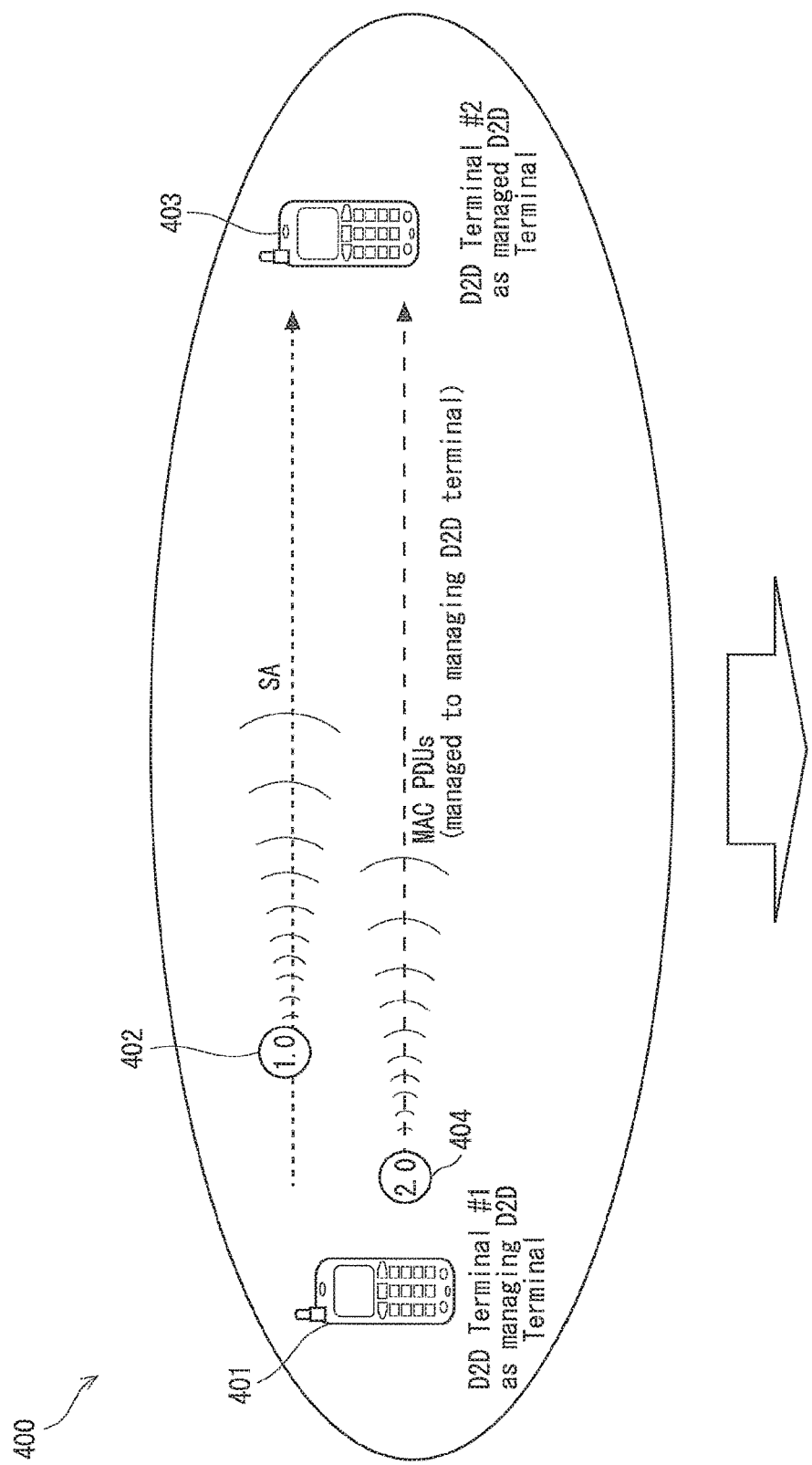

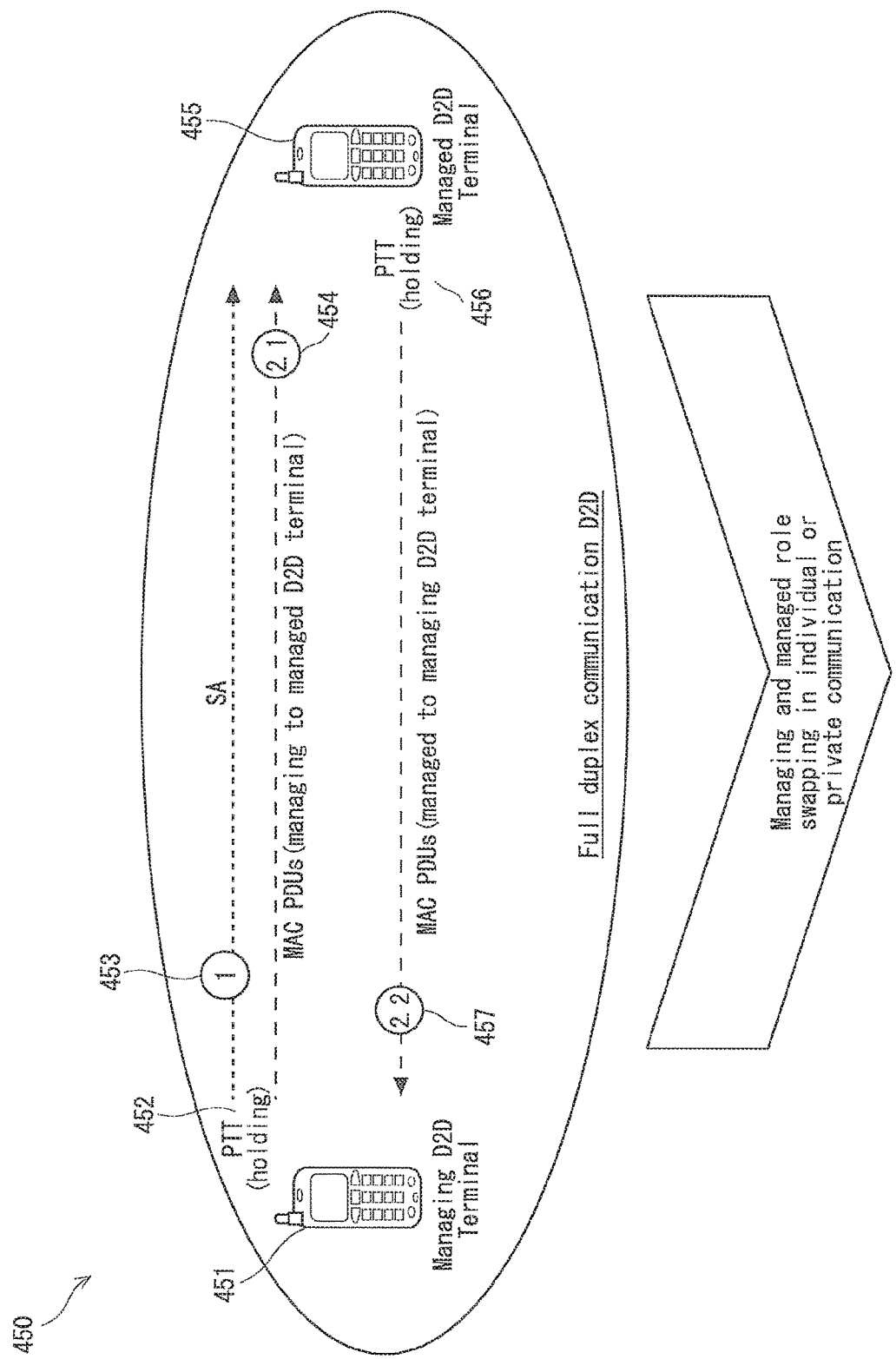

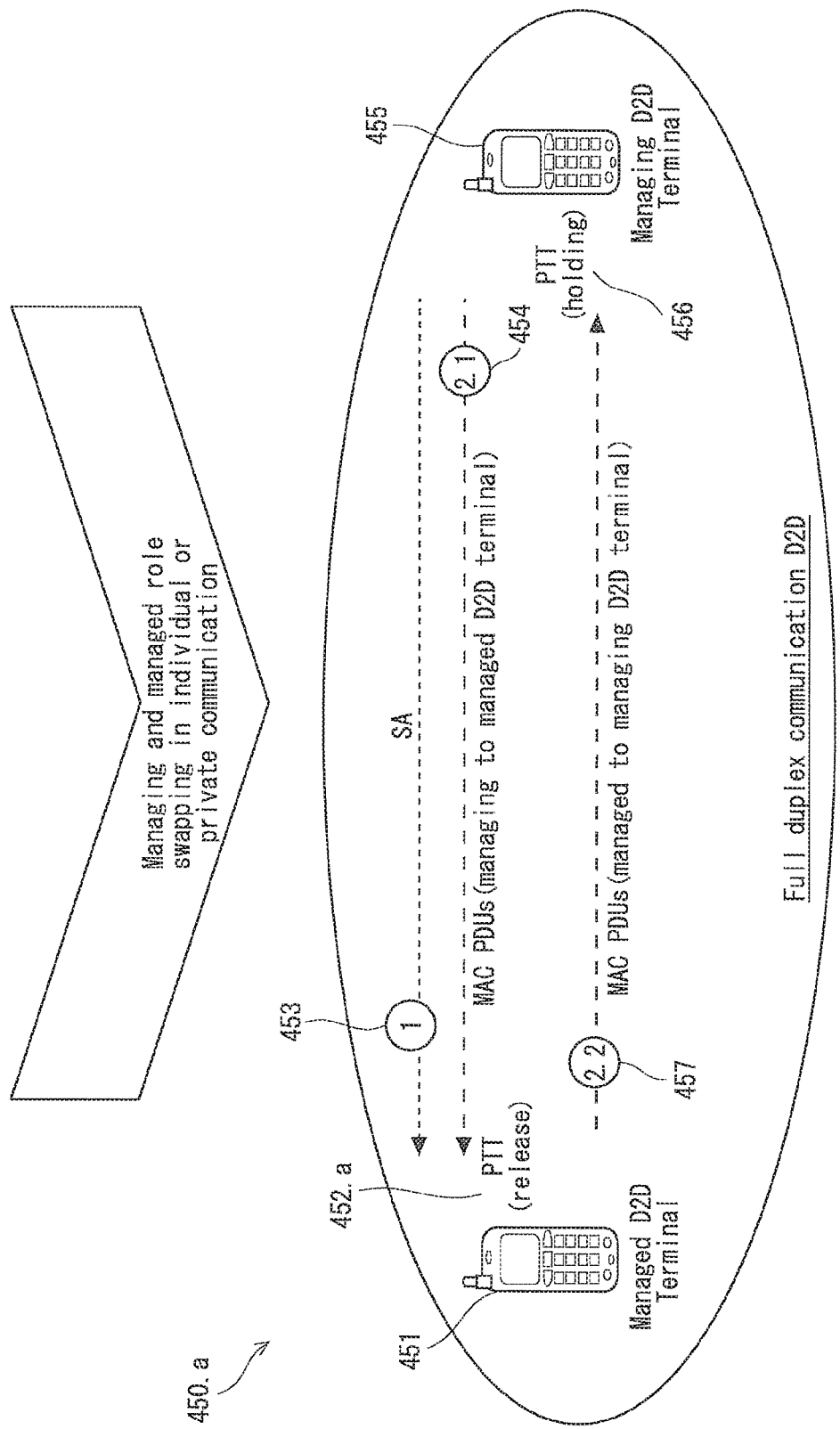

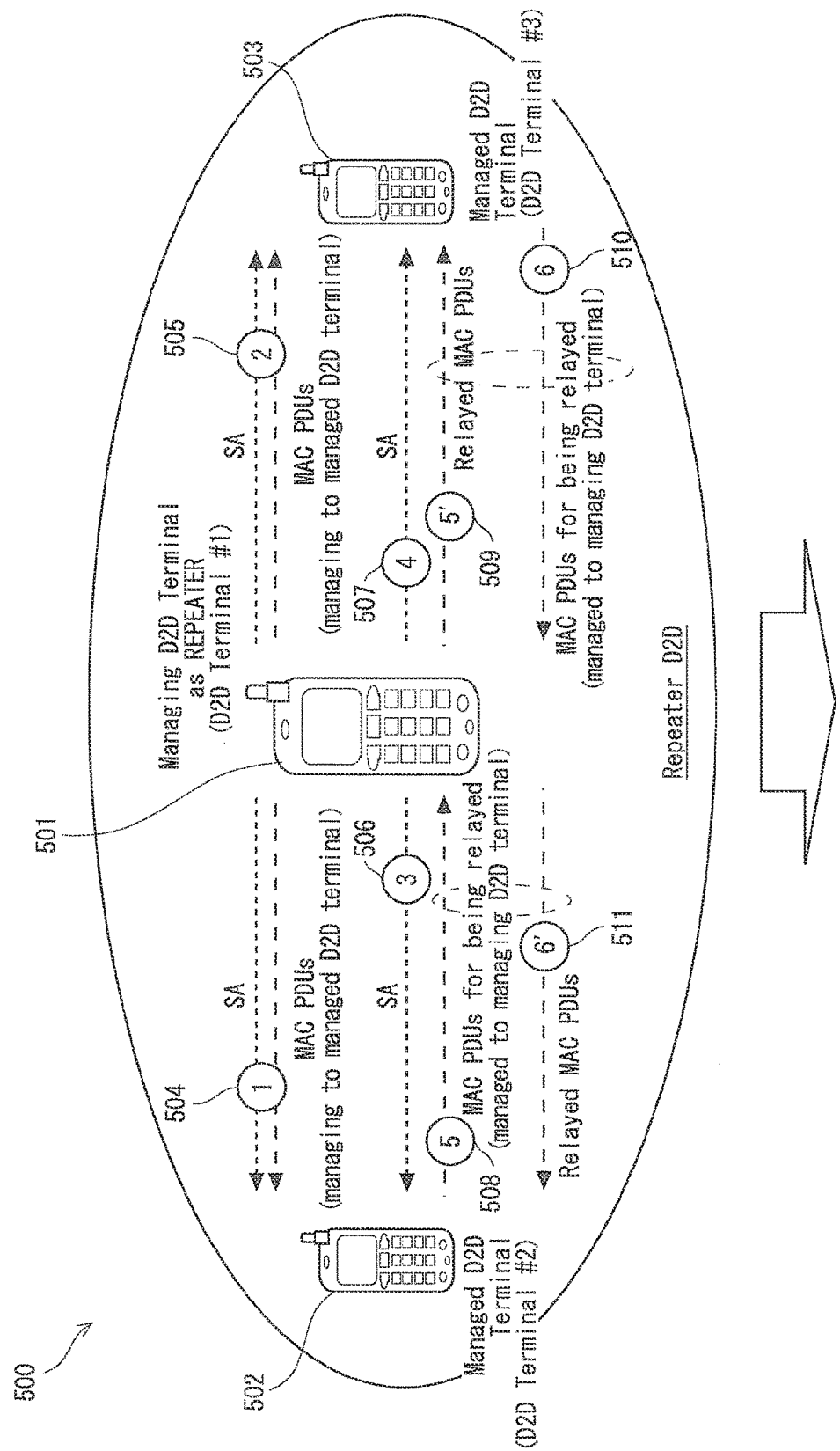

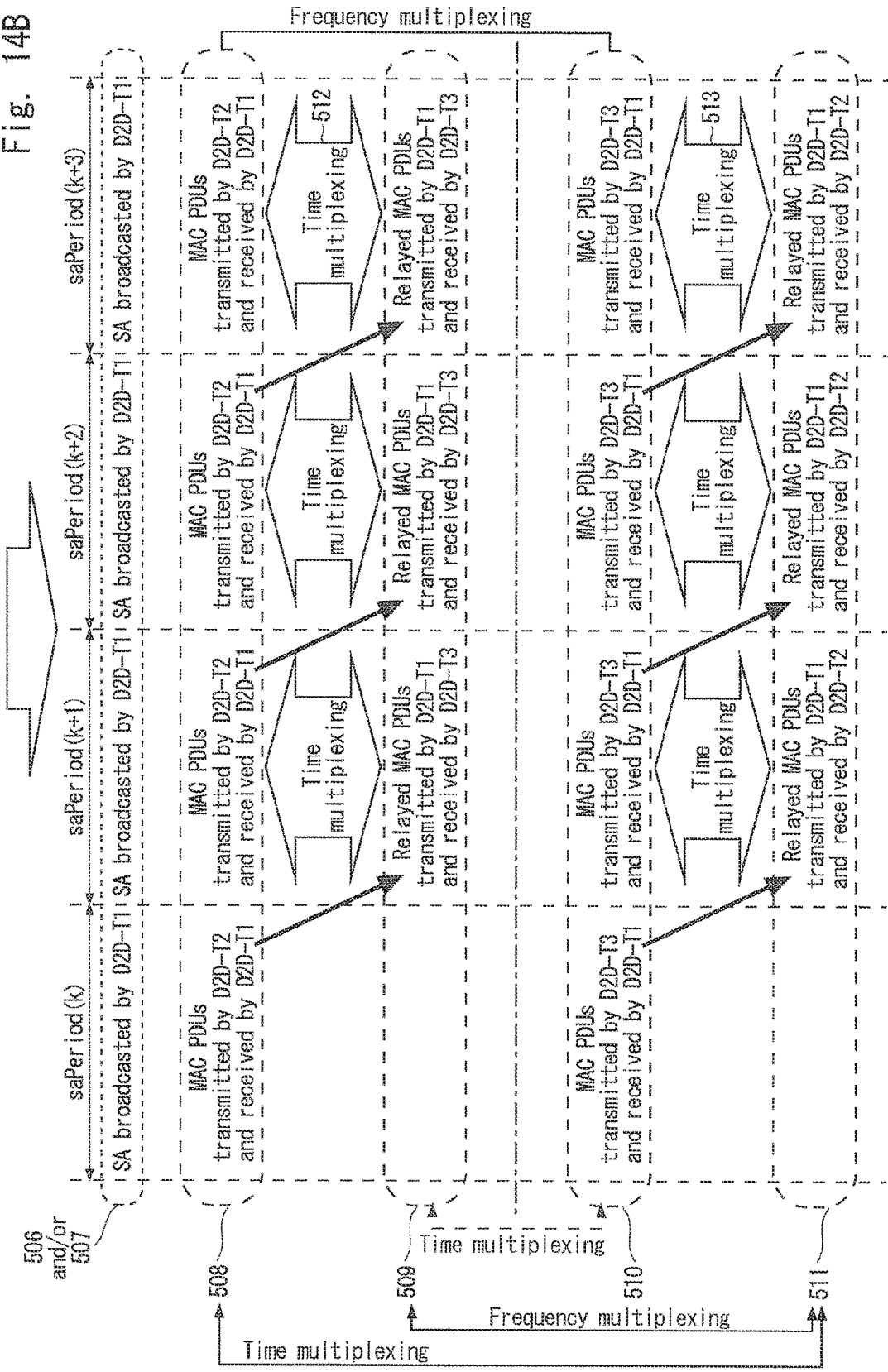

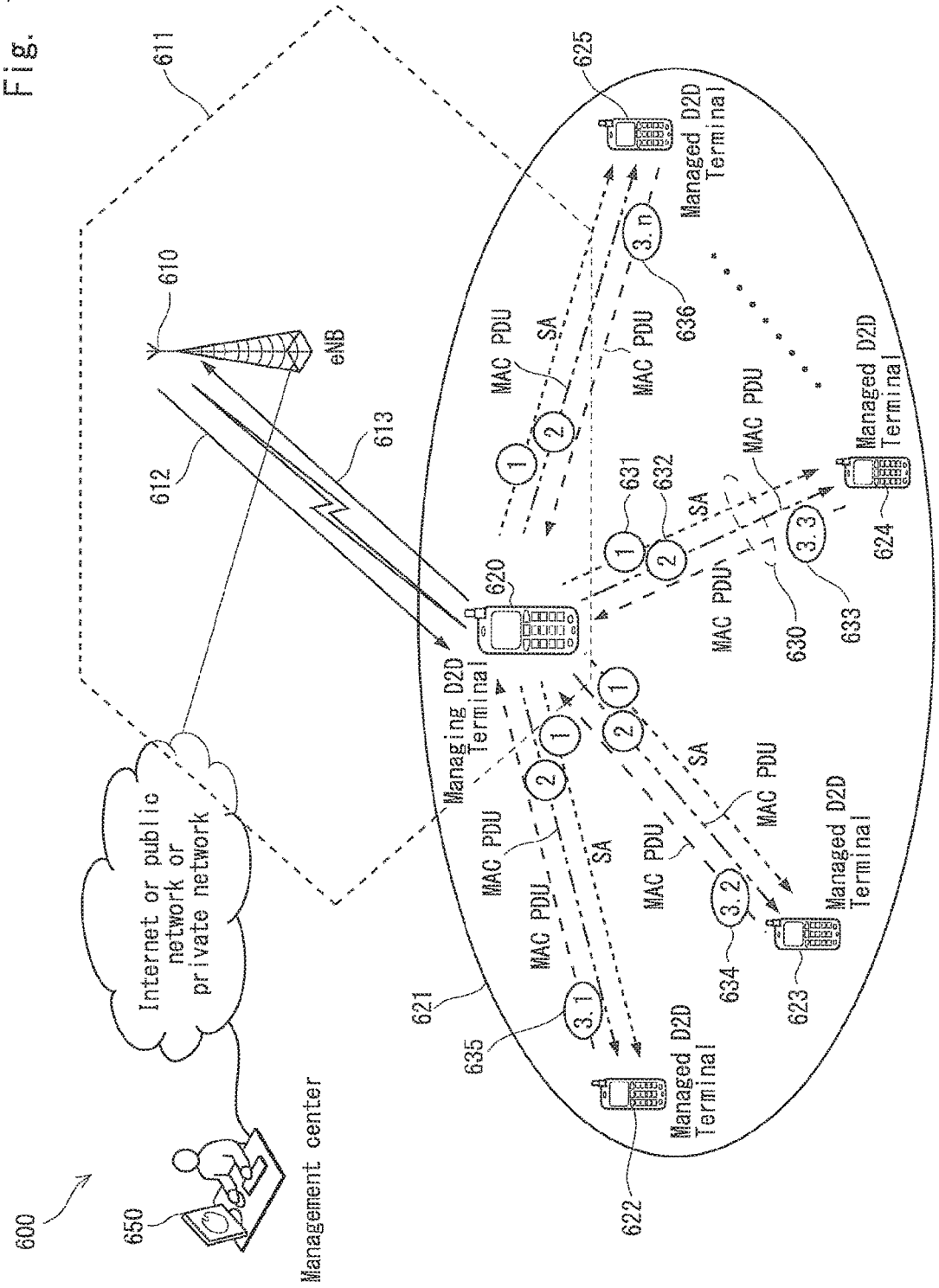

METHOD AND SYSTEM FOR DEVICE TO DEVICE COMMUNICATION

CROSS REFERENCE TO RELATED APPLICATIONS

This application is a National Stage of International Application No. PCT/JP2016/000668, filed on Feb. 9, 2016, which claims priority from Australia Patent Application No. 2015900449, filed on Feb. 12, 2015, the contents of all of which are incorporated herein by reference in their entirety.

TECHNICAL FIELD

The present invention relates to device-to-device communication.

Abbreviations

| | |
|---|---|
| 3GPP | 3rd Generation Partnership Project |
| D2D | Device-to-Device Communication or Direct |
| D2D-UE | Cellular User equipment with direct communication |
| eNB or eNodeB | Evolved NodeB |
| ePDCCH | enhanced Physical Downlink Control Channel |
| FDD | Frequency Division Duplex |
| LTE | Long Term Evolution |
| MAC | Medium Access Control |
| MAC PDU | Medium Access Control Protocol Data Unit |
| MCC | Mission Critical Communication |
| PTT | Push to Talk or Press to Transmit While one device transmits, the other(s) receive. |
| RB | Resource Block |
| RLC | Radio Link Control |
| RX | Receive |
| SA | Scheduling Assignment |
| TB | Transport Block |
| TDD | Time Division Duplex |
| T-RPT | Time Resource Pattern of Transmission |
| TX | Transmit |
| UE | User Equipment |

BACKGROUND ART

Recent advancements in the field of cellular communication include supporting direct or device-to-device (D2D) communication between two or more mobile devices operating in the licensed spectrum. This has largely been motivated by the popularity of proximity based services steered by public safety needs as well as social networking applications trends. By enabling direct communication, D2D capable user equipments (D2D-UEs) are able to exploit their proximity with each other to communicate under network coverage and/or out of network coverage. As such, D2D-UEs are able experience reliable, high quality and versatile voice and data communication, and high speed data rates. D2D communication may also increase a capacity of a cellular network due to traffic offloading.

In mission-critical communications (MCC), users generally need to be able to communicate everywhere at any time, regardless of lack of network coverage, lack of resources, and in case of any type of network failure. This is particularly the case in emergency communications.

FIG. 1 illustrates a chart 100 of Mission Critical Communication Modes vs Applications for D2D communication. In particular, several D2D operation modes 110, including direct mode 120, repeater mode 130, network gateway (or relay) mode 140, and multi-watch or multi-channels monitoring/listening mode 150 are illustrated with reference to a plurality of applications 160, including voice 161, user messages/data 162, regular status reports (e.g. position reports or periodic check-in) 163 and/or high speed data 164.

In MCC, D2D communication can be used to provide a private call directly with another user, as illustrated in system 121 of FIG. 2, or to provide group calls with several other users, as illustrated in system 125 of FIG. 3. In both cases, users are within proximity of each other, but may be with or without network coverage or network infrastructure support. The call may be voice call, short burst data call or high speed data call.

Furthermore, a repeater D2D terminal 135 can be used to enlarge D2D coverage 136 when needed, as illustrated with reference to system 131 of FIG. 4, enabling a first D2D terminal 132 to communicate with a second D2D terminal 133 even though the first and second D2D terminals 132, 133 are out of range with each other due to distance separation or shadowing (i.e. shadow fading). This is possible as both the first D2D terminal 132 and the second D2D Terminal 133 are within the transmission range of the D2D repeater 135.

Yet further again, as illustrated with reference to system 141 in FIG. 5, a gateway D2D terminal 142 that is in a coverage area of a network (144) can be configured to provide network connectivity services for an out of network coverage D2D terminal 143 to communicate with its management centre 145, or with another D2D terminal 146 that is in the same communication group, or even with different communication groups but is not in the local area.

Finally, as illustrated with reference to system 151 of FIG. 6, a mobile command unit D2D terminal 152 may be configured to monitor/listen on air interfaces 153, 155, 157 to more than one D2D group communication 154, 156 and cellular network in a geographical overlapping local area 159. The mobile command unit D2D terminal 152 may have multi-watch or multi-channel monitoring/listening capability that may also have network gateway capability to provide connectivity to surrounding D2D terminal to communicate to a management centre 160 and enable communication among different public safety agencies operating in the same local area.

The 3rd Generation Partnership Project (3GPP) has been working towards including D2D communication as an overlay to its existing Long Term Evolution (LTE) cellular network, with the target of bringing support for public safety communication into its upcoming Release 12 and future Release 13. Mission Critical (MC) Push-To-Talk (PTT) functionality, similar to that provided by Professional Mobile Radio (PMR) and Land Mobile Radio (LMR) systems, has been prioritised for inclusion into the upcoming Releases. MC-PTT primarily targets group call support, but private or individual one-to-one calls will also be supported. The 3GPP specified MC-PTT is likely to work in both in-network and out-of-network scenarios, but it is generally understood that not all functions will be available when a device operates out-of network.

3GPP MC-PTT is anticipated to include regular group calls and broadcast group calls, as illustrated in the system 200 in FIG. 7A and FIG. 7B, where no response is expected by the initiating user equipment 221 and groups calls based on priorities such as an emergency group call may pre-empt other calls in progress. Private or individual one-to-one calls, where the call can be heard by other users may also be supported. Calls (i.e. voice call or user data call) initiated by a user may happen in an ad-hoc/random fashion, where each call starts with selecting a Scheduling Assignment (SA) resource index randomly for SA (225) transmission followed by associated MAC-PDUs transmission (226) resulting in a half-duplex communication within an SA period.

Technically, the anticipated 3GPP MC-PTT system is sufficient for voice and user data communication in the basic direct or D2D mode (corresponding to 121 and 125 of FIG. 2 and FIG. 3) where each call arrives as random events. However, the anticipated 3GPP MC-PTT system is unable to provide repeater functionality, such as illustrated in 131 of FIG. 4, network relay functionality, as illustrated in 141 of FIG. 5, or multi-watch or multi-channel monitoring/listening functionality, as illustrated in 151 in FIG. 6.

In these cases, a centralised/field device or network relay device would experience a large amount of messages that are periodically sent from the devices that are attached to it causing interference/collision at its receiver. For example, with reference to system 300 of FIG. 8, when periodic position reporting or periodic system check-in for lone field personnel is used, collision and/or interference occurs at the D2D terminal receiver 301 as D2D Terminal 2 302, D2D Terminal 3 303 to D2D Terminal k 304 may independently, simultaneously and periodically transmit data to the field control D2D Terminal 1 301. That can result in the loss of a position information report or failure of a system check-in from other D2D-UEs transmitters, such as D2D terminals 302, 303, 304.

As such, there is a need for an improved method and system for D2D communication.

It will be clearly understood that, if a prior art publication is referred to herein, this reference does not constitute an admission that the publication forms part of the common general knowledge in the art in Australia or in any other country.

SUMMARY OF INVENTION

The present invention is directed to a method and system for device-to-device (D2D) communication, which may at least partially overcome at least one of the abovementioned disadvantages or provide the consumer with a useful or commercial choice.

Various embodiments of the invention provide D2D (also referred to as peer to peer (P2P) communication or direct mode communication) within licensed spectrum that has been allocated for public safety communication and/or cellular communication. An example of such communication includes long term evolution (LTE) network communication as specified by the 3rd Generation Partnership Project (3GPP). As discussed in further detail below, embodiments of the invention may enable or provide full duplex communication improving user experience in PTT individual call, repeater D2D, and network relay D2D or network gateway D2D in mission critical communication (MCC) system.

With the foregoing in view, the present invention in one form, resides broadly in a method of device-to-device (D2D) communication, the method including:

providing, from a first D2D-UE to at least one second D2D-UE, a scheduling configuration, wherein the first D2D-UE and the at least one second D2D-UE form a managed D2D group; and providing, from the first D2D-UE to the at least one second D2D-UE, data according to the scheduling configuration.

The data may be transmitted on a reserved channel of the scheduling configuration.

The reserved channel may be defined at least in part according to a scheduling assignment (SA) resource index of the scheduling configuration.

The scheduling configuration may be provided at least in part as a scheduling assignment (SA). For example, the scheduling configuration may be provided as a combination of the SA and associated MAC-PDUs.

The method may further comprise, selectively authorizing the at least one second D2D-UE to transmit data on the reserved channel.

The first D2D-UE may authorize a second D2D-UE of the at least one second D2D-UE to transmit data on a Time Resource Pattern of Transmission (T-RPT) on which the first D2D-UE transmits data to the second D2D-UE.

Full duplex communication may be provided between the first D2D-UE and the second D2D-UE on the reserved channel.

The at least one second D2D-UE may comprise a plurality of D2D-UE's, wherein the first D2D-UE authorizes the plurality of D2D-UEs to transmit data on the T-RPT on which the first D2D-UE transmits data to the plurality of D2D-UEs.

The first D2D-UE may authorize the plurality of D2D-UEs to transmit data by providing transmission patterns to the plurality of D2D-UEs, wherein transmission patterns are provided in an SA, and an SA-ID field of a provided SA is used to identify a D2D-UE of the more than one D2D-UE for which the transmission patterns are intended.

The method may further include providing frequency resource indexes to the plurality of D2D-UEs to manage frequency domain interference at the first D2D-UE.

The method may further include providing mission critical push-to-talk (MCPTT) between the first D2D-UE and the at least one second D2D-UE.

The first D2D-UE may be configured to operate as a repeater, allowing one D2D-UE of the at least one second D2D-UE and an other D2D-UE of the at least one second D2D-UE to communicate with each other.

The method may further include establishing a first managed D2D group comprising the first D2D-UE and the one D2D-UE, and a second managed D2D group comprising the first D2D-UE and the other D2D-UE.

A T-RPT may be used for simultaneous transmission and reception of data between the first D2D-UE and the at least one second D2D-UE.

The data from different second D2D-UEs may be frequency multiplexed.

The data may comprise Medium Access Control-Protocol Data Units (MAC-PDUs), and an SA-ID is used to differentiate MAC-PDUs transmitted to the one D2D-UE with the MAC-PDUs transmitted to the other D2D-UE.

The first D2D-UE may be configured to operate as a network relay to the at least one second D2D-UE, to provide network connectivity to the at least one second D2D-UE.

The scheduling configuration may comprise a resource pool configuration that is configured by a base station that provides network coverage to the first D2D-UE.

The method may further comprise periodically broadcasting the scheduling configuration by the first D2D-UE to allow new arrival D2D-UEs to use the network relay services.

The data may comprise MAC-PDUs, and an SA-ID is used to differentiate MAC-PDUs carrying resource pool configuration with the MAC-PDUs carrying network originated relayed data.

The at least one second D2D-UE may be able to communicate with a management centre that administers the at least one second D2D-UE in an MCC system by the provided network coverage. The first D2D-UE may include the management centre functions.

In another form, the invention resides broadly in a device-to-device (D2D) communication system, the system including:
a first D2D-UE that is configured to:
provide to the at least one second D2D-UE, a scheduling configuration, wherein the first D2D-UE and the at least one second D2D-UE form a managed D2D group; and
provide to the at least one second D2D-UE, data according to the scheduling configuration.

According to certain embodiments, methods are provided for transmitting a scheduling assignment (SA) and associated Medium Access Control-Protocol Data Units (MAC-PDUs) in managed D2D communication. A first D2D-UE may be assigned or configured as a managing or coordinating D2D-UE in an established managed or coordinated D2D group. The first D2D-UE may provide authorising signals to second D2D-UEs, wherein the second D2D-UEs are assigned or configured to be the managed or coordinated D2D-UEs. The second D2D-UEs may be restricted from transmitting MAC-PDUs unless they receive an authorising signal from the first D2D-UE. Furthermore, embodiments of the invention may provide full duplex communication enhancing user experience in push to talk (PTT) private calls, repeated D2D, or network gateway or relay D2D mode for use in a mission critical communication (MCC) system.

According to embodiments of the present invention, once a managed D2D group has been established, the managing D2D-UE always have the authority to transmit SA(s) and associated MAC-PDUs on reserved channel(s). The reserved channel(s) may be defined as SA resource indexes or ranges of SA resource indexes. In transmitting SAs and associated MAC-PDUs concurrently addressing multiple managed D2D-UEs, the managing D2D-UE may use the same time resource pattern transmission (T-RPT) or non-overlapping T-RPTs for the mapping of associated MAC-PDUs. MAC-PDUs concurrently addressing multiple managed D2D-UEs sharing the same T-RPT may be frequency multiplexed.

The managing D2D-UE may further use an SA ID field in the transmitted SA for mapping the managing D2D terminal MAC-PDU transmission pattern to a managed D2D-UE, enabling the managed D2D-UE to perform reception and decoding of the MAC-PDUs intended for it. Alternatively, in a managed D2D group, the managing D2D-UE may periodically or on demand transmit a single SA or multiple SAs to multiple managed D2D-UEs concurrently, providing control information and authorisation signals, enabling the managed D2D-UEs to encode and transmit associated MAC-PDUs in the SA period. The managing D2D-UE may provide scheduling related information allowing multiple managed D2D-UEs to share the same time resource pattern transmission (T-RPT) or non-overlapping T-RPTs for the mapping of their transmitting MAC-PDUs. MAC-PDUs concurrently transmitted by multiple managed D2D-UEs sharing the same T-RPT may be frequency multiplexed.

The managing D2D-UE may further use an SA ID field to differentiate the MAC-PDUs transmission patterns that should be followed by the managed D2D-UEs. Furthermore, in a managed D2D group, the managing D2D-UE may periodically or on demand transmit single SA or multiple SAs intending to multiple managed D2D-UEs concurrently providing scheduling information and layer 1 or physical layer control information for the reception and decoding the associated MAC-PDUs transmitted by the managing D2D-UE. The managing D2D-UE may provide authorisation signal and scheduling related information for the encoding and transmission of associated MAC-PDUs at the managed D2D-UEs in the same SA-Period in the SA alone or the combination of SA and associated MAC-PDUs. The scheduling related information may appear in the application control algorithmic format that is self-decodable at a managed D2D-UE. The managing D2D-UE may use the same T-RPT for scheduling the MAC-PDUs transmission and reception to and from intended managed D2D-UEs.

According to certain embodiments, a call-initialising D2D-UE may automatically act as managing D2D-UE to establish a managed D2D group with a call receiving D2D-UE, i.e. the managed D2D-UE. In establishing and maintaining the connection with the managed D2D-UE the managing D2D-UE may select an SA resource index in every SA period for transmitting the SA, reserving the T-RPT for transmitting the associated MAC-PDUs to and receiving the associated MAC-PDUs from the managed D2D-UEs. As such, full duplex communication can be realised on an SA period basis.

According to other embodiments, a first D2D-UE may be configured to operate in a "repeater D2D" mode, allowing a second D2D-UE and a third D2D-UE which are out of range with each other to communicate with each other. In such case, the first D2D-UE may automatically act as managing D2D-UE to establish first and second managed D2D groups for the second D2D-UE and the third D2D-UE respectively. In configuring the second D2D-UE in first managed D2D group and the third D2D-UE in the second managed D2D group, the first D2D-UE may broadcast two independent SAs, and utilise the same T-RPT for delivering the associated MAC-PDUs in a frequency-multiplexed fashion to the second D2D-UE and third D2D-UE respectively.

In providing D2D repeating services, the first D2D-UE may periodically broadcast SAs providing authorising signal and scheduling related information for the second and the third D2D-UEs to receive the relayed MAC-PDUs and/or to transmit the MAC-PDUs for being relayed. The first D2D-UE may use the same T-RPT for concurrently transmitting the relayed MAC-PDUs or receiving the MAC-PDUs for being relayed in different managed D2D groups. The first D2D-UE may use the same T-RPT or non-overlapping T-RPT for transmitting the relayed MAC-PDUs and receiving the MAC-PDUs for being relayed in a managed D2D group.

According to certain embodiments, a first D2D-UE in network coverage may be configured to operate in a "network relay D2D" mode providing network connectivity services to other surrounding second D2D-UEs that are out-of-network coverage. As such, the first D2D may enable the second D2D-UEs to communicate with a remote management centre or other D2D-UEs which can only be communicated with through the network.

Once being configured to operate in "network relay D2D" mode, the first D2D-UE may automatically act as managing or coordinating D2D-UE to establish a managed or coordinated D2D group (or groups) having the second D2D-UEs. Within the managed D2D group(s), the first D2D-UE may configure the second (managed) D2D-UEs to apply the network's mode-2 resource pool configuration for SAs and associated data transmission and reception within the said managed group. In such case, the first D2D-UE may further provide its network's mode-2 resource pool configuration to the second D2D-UEs in the managed D2D group in the form of MAC-PDUs or application layer data. The first D2D-UE may use the SA-ID to differentiate periodically broadcasted MAC-PDUs carrying network's mode-2 resource pool configuration with relayed MAC-PDUs. By applying the mode- 2's network resource pool configuration in its managed groups, the managing D2D-UE can coordinate the D2D and cellular signal transmission/reception on a subframe basis without network/eNB intervention. The first D2D-UE may periodically broadcast SA or SAs providing control information and authorising signal for MAC-PDUs transmission from the managed D2D-UEs. The first D2D-UE may configure multiple managed D2D-UEs sharing the same T-RPT for transmitting their MAC-PDUs. In the case that multiple managed D2D-UEs share a subframe for transmitting their MAC-PDUs, the first D2D-UE may pre-configure the managed D2D-UEs with customised algorithm for self-deriving or self-decode frequency resource index resulting in non-overlapping physical resource block(s) (PRB) selection.

Embodiments of the present invention provide managed (or coordinated) D2D communication that can be configured to be coexistent with the standard (PTT) D2D mode. The managed D2D communication can assist in removing potential interference at D2D-UE's in an environment or applications where multiple D2D-UEs concurrently and periodically attempt to transmit data to a centralised D2D-UE.

Advantageously, embodiments of the present invention enable more efficient utilisation of D2D resources.

Embodiments of the present invention advantageously provide mission critical communication including repeater, network relay, and multi-watch or multi-channel-monitoring/listening functionality.

Embodiments of the present invention provide enhanced user experience in private calls when compared with standard Push-to-talk (PTT) private calls, as full duplex communication can be provided.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 6 illustrates a system including multi-watch D2D communication;

FIG. 7A illustrates a system including MC-PTT design for group calls and broadcast group calls according to the prior art;

FIG. 9A illustrates a D2D communication system, according to an embodiment of the present invention;

FIG. 12A illustrates a further D2D communication system, for providing managed D2D communication to realise full duplex communication in a private PPT voice call, according to an embodiment of the present invention;

FIG. 12B illustrates a further D2D communication system, for providing managed D2D communication to realise full duplex communication in a private PPT voice call, according to an embodiment of the present invention;

FIG. 14A illustrates a further D2D communication system, for providing managed D2D communication to realise a D2D repeater, according to an embodiment of the present invention;

FIG. 14B illustrates a further D2D communication system, for providing managed D2D communication to realise a D2D repeater, according to an embodiment of the present invention; and FIG. 15 illustrates a further D2D communication system, for providing managed D2D communication to realise a D2D network gateway, according to an embodiment of the present invention.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Embodiments of the present invention provide managed (also referred to as coordinated) D2D communication. As discussed in further detail below, certain embodiments of the invention provide an operational mode in addition to other MCC-PTT modes, such as MCC-PTT of 3GPP Release 12.

Figure 1:
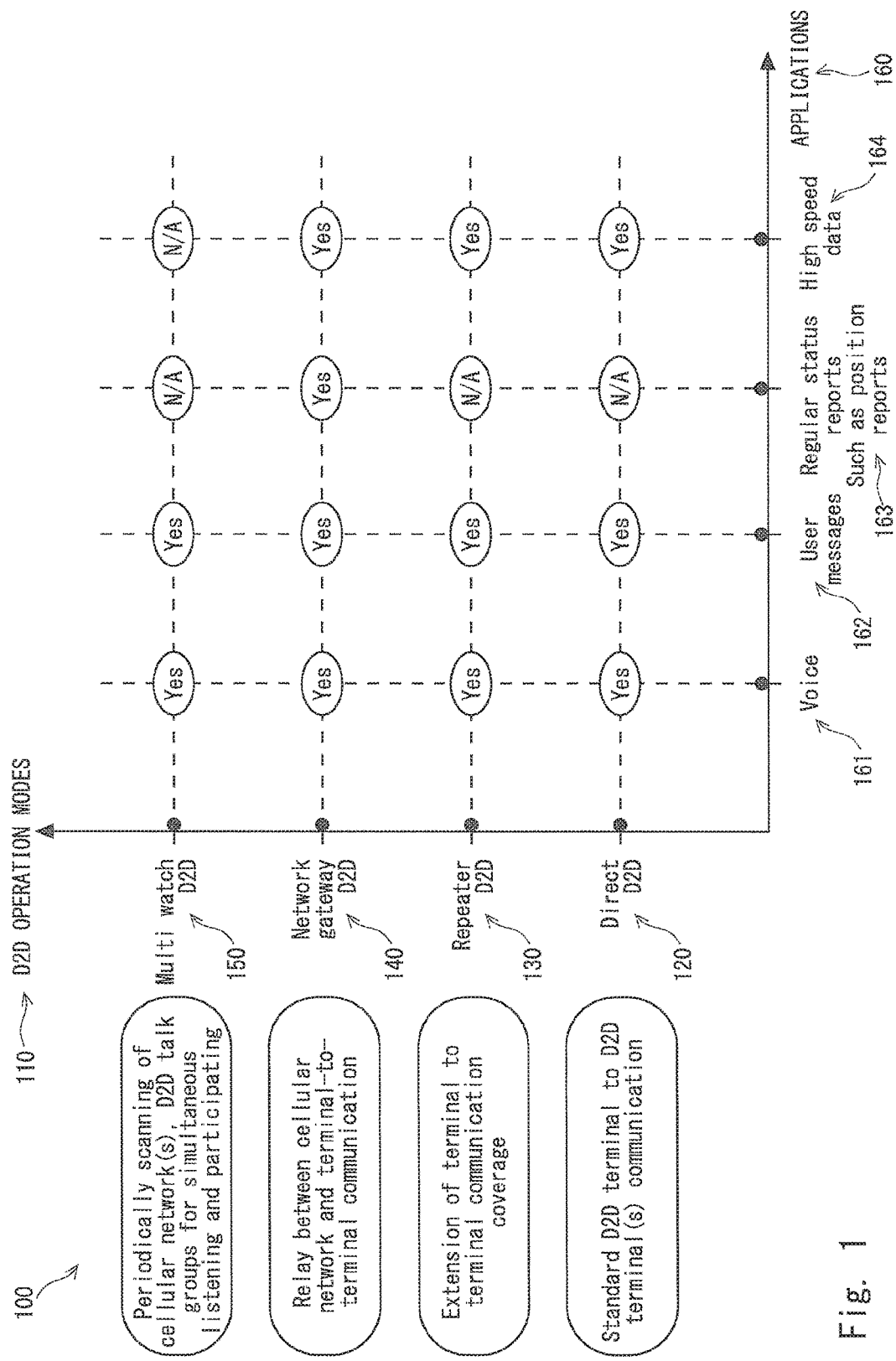
FIG. 1 illustrates a chart 100 of Mission Critical Communication Modes vs Applications for D2D communication.
Figure 2:
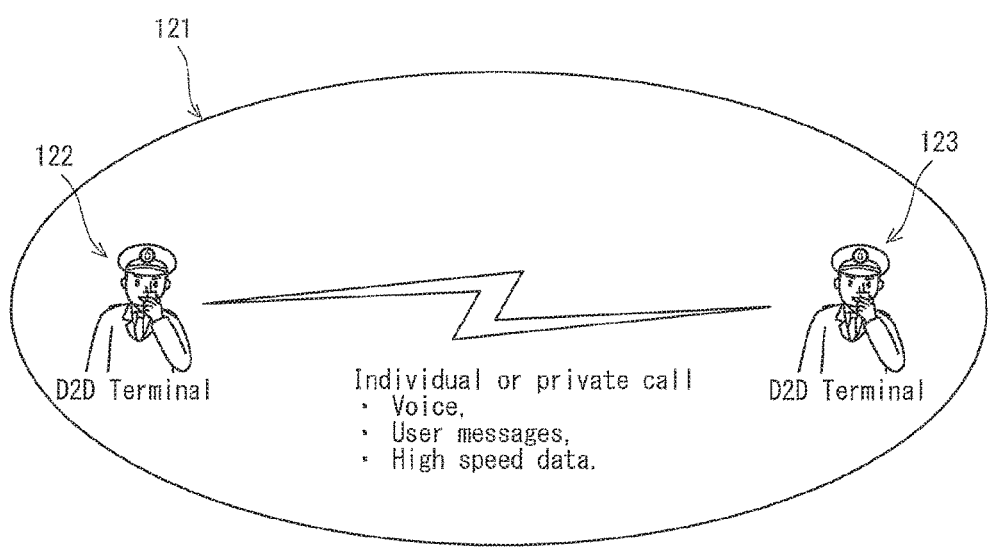
FIG. 2 illustrates a system for MCC individual or private calls.
Figure 3:
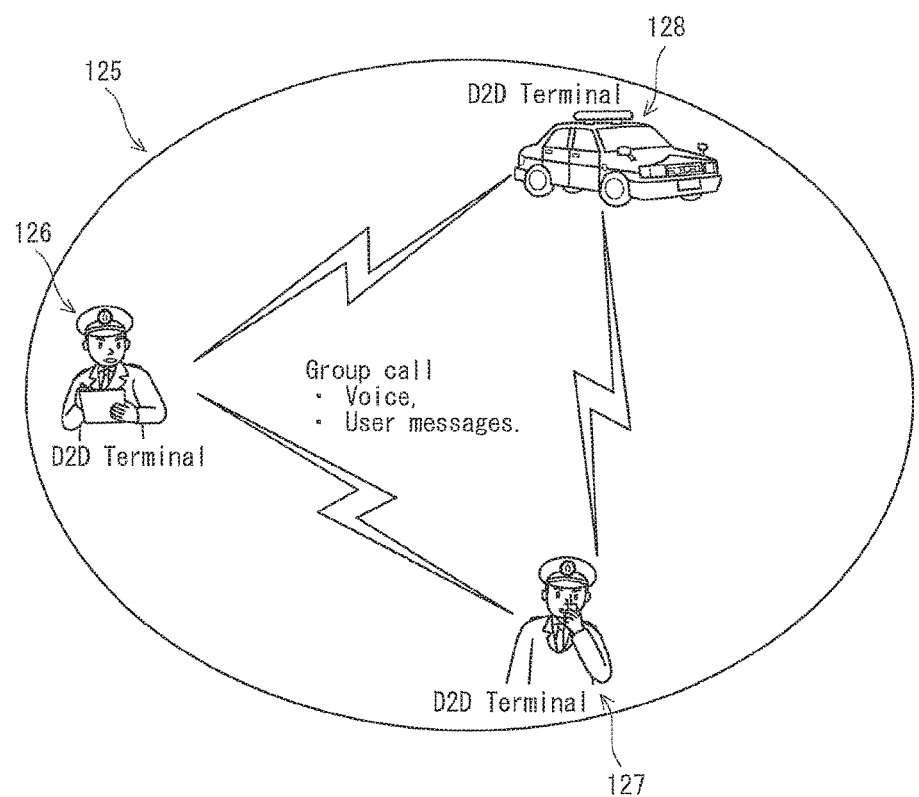
FIG. 3 illustrates a system a system for MCC group calls.
Figure 4:
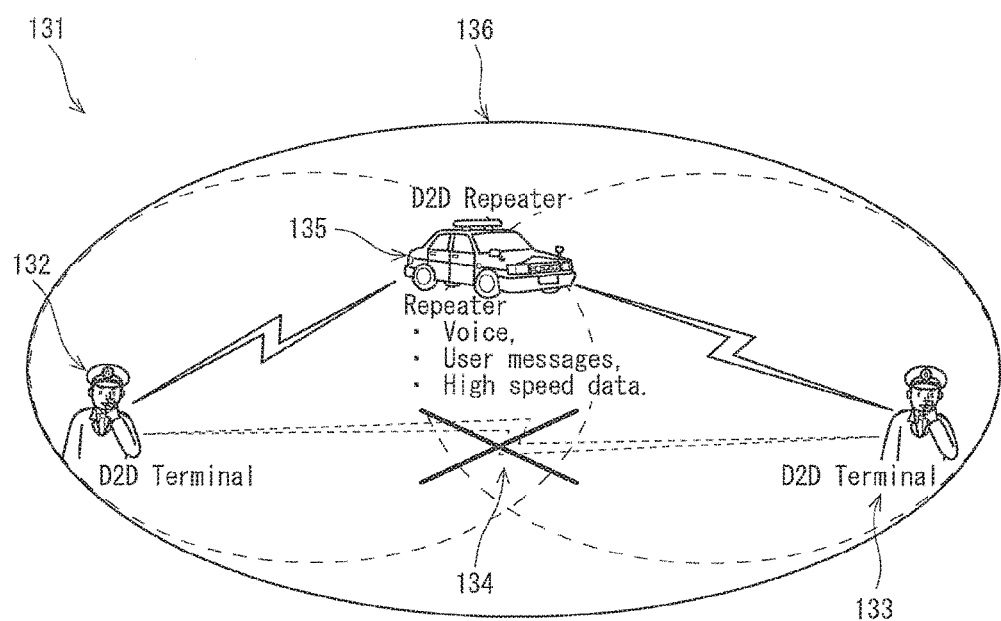
FIG. 4 illustrates a system including a D2D repeater.
Figure 5:
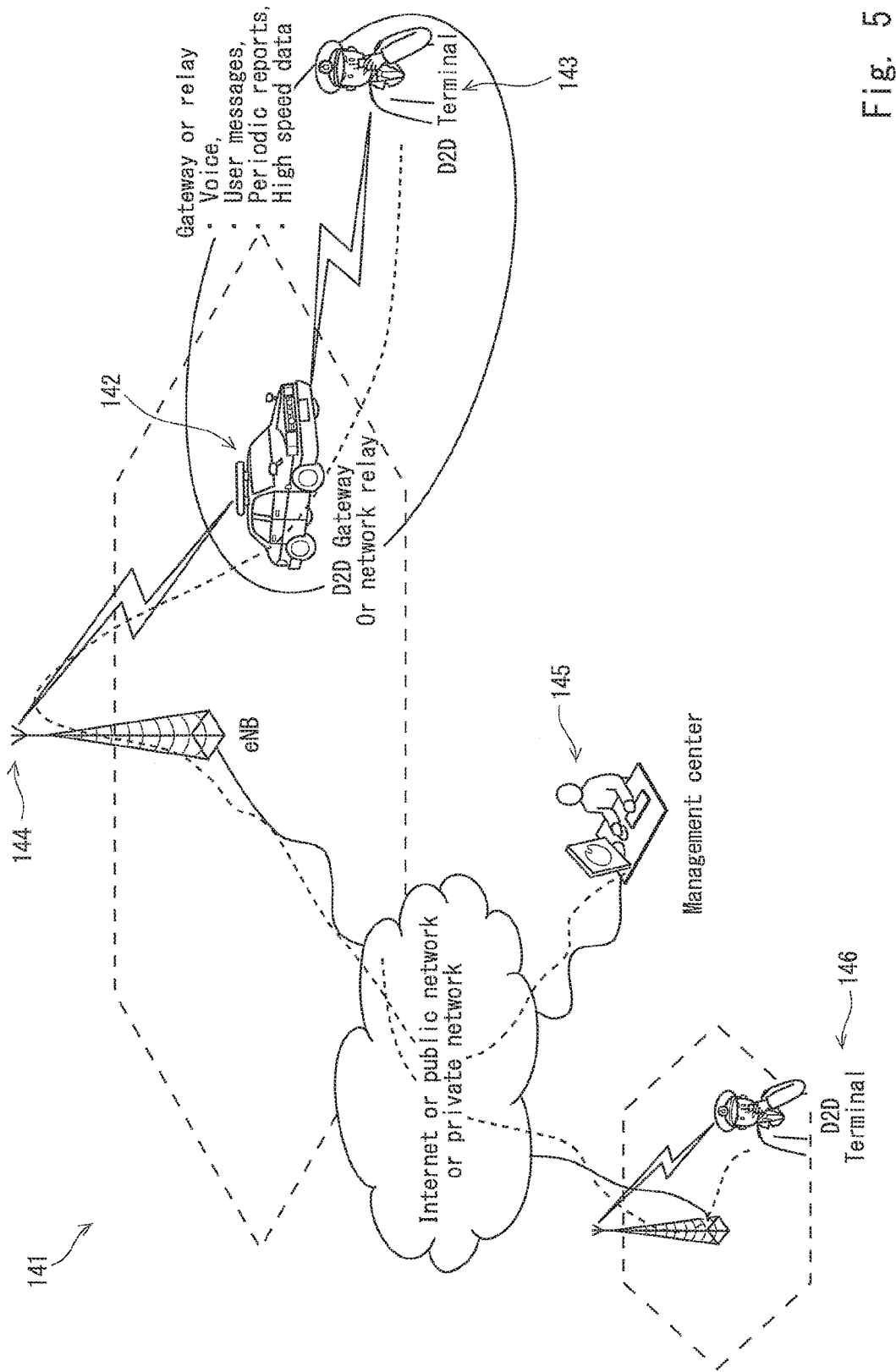
FIG. 5 illustrates a system including a network gateway or relay.
Figure 7B:
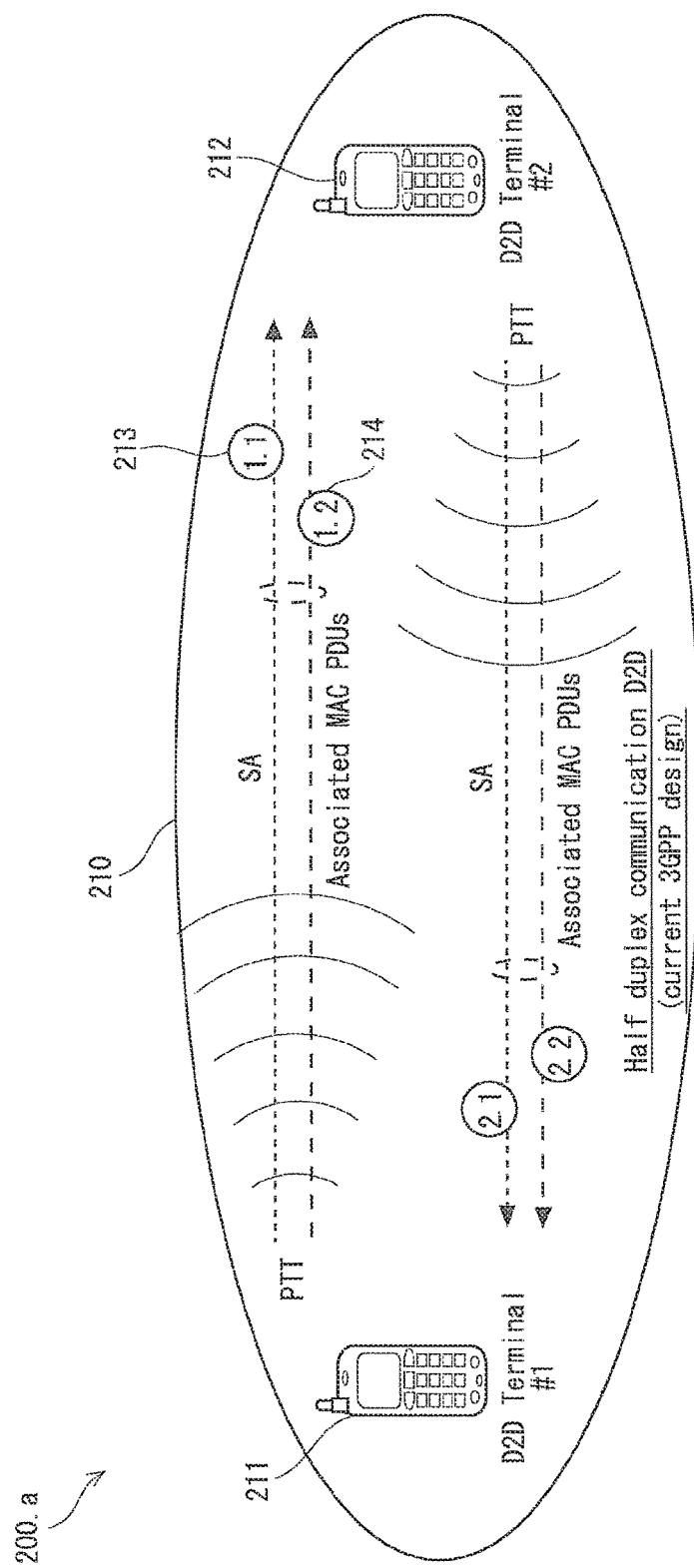
FIG. 7B illustrates a system including MC-PTT design for group calls and broadcast group calls according to the prior art.
Figure 8:
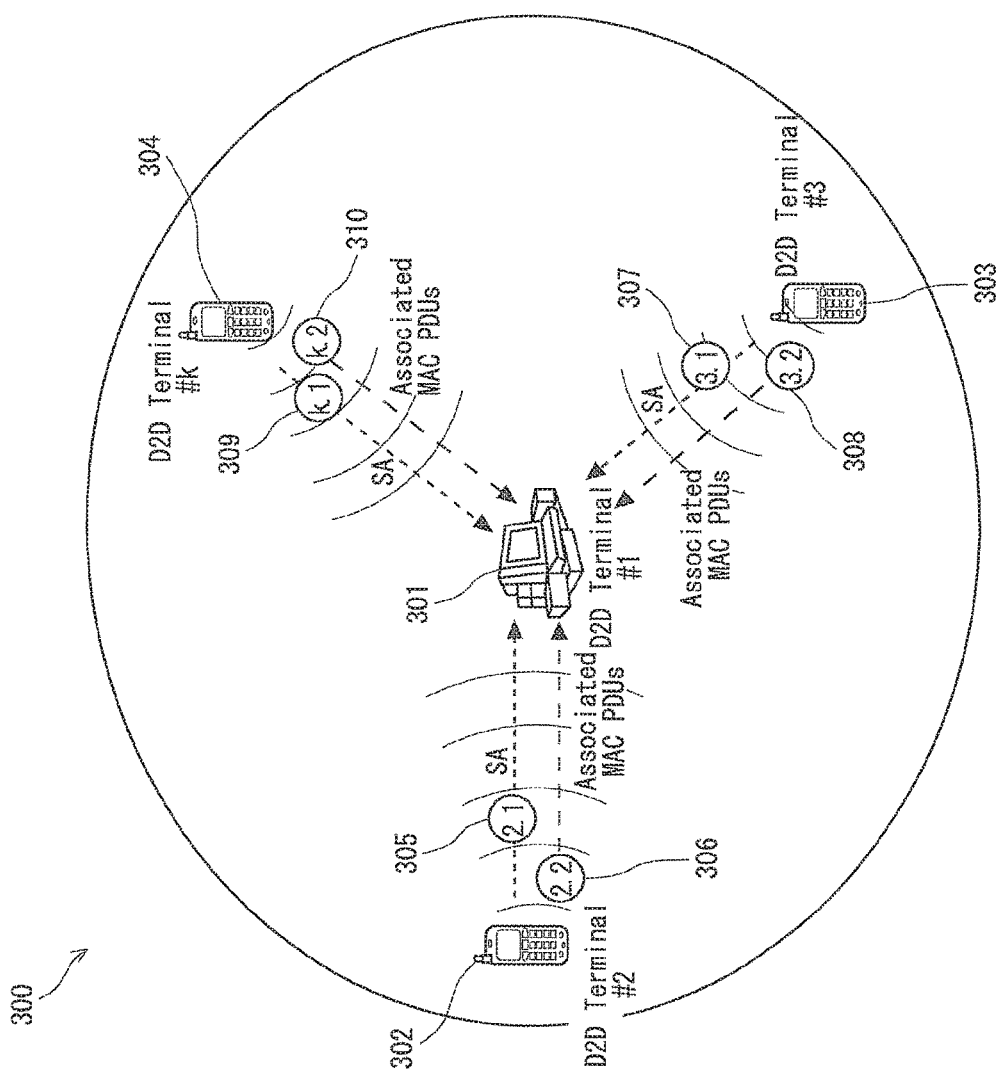
FIG. 8 illustrates a system D2D-system according to the prior art.
Figure 9B:
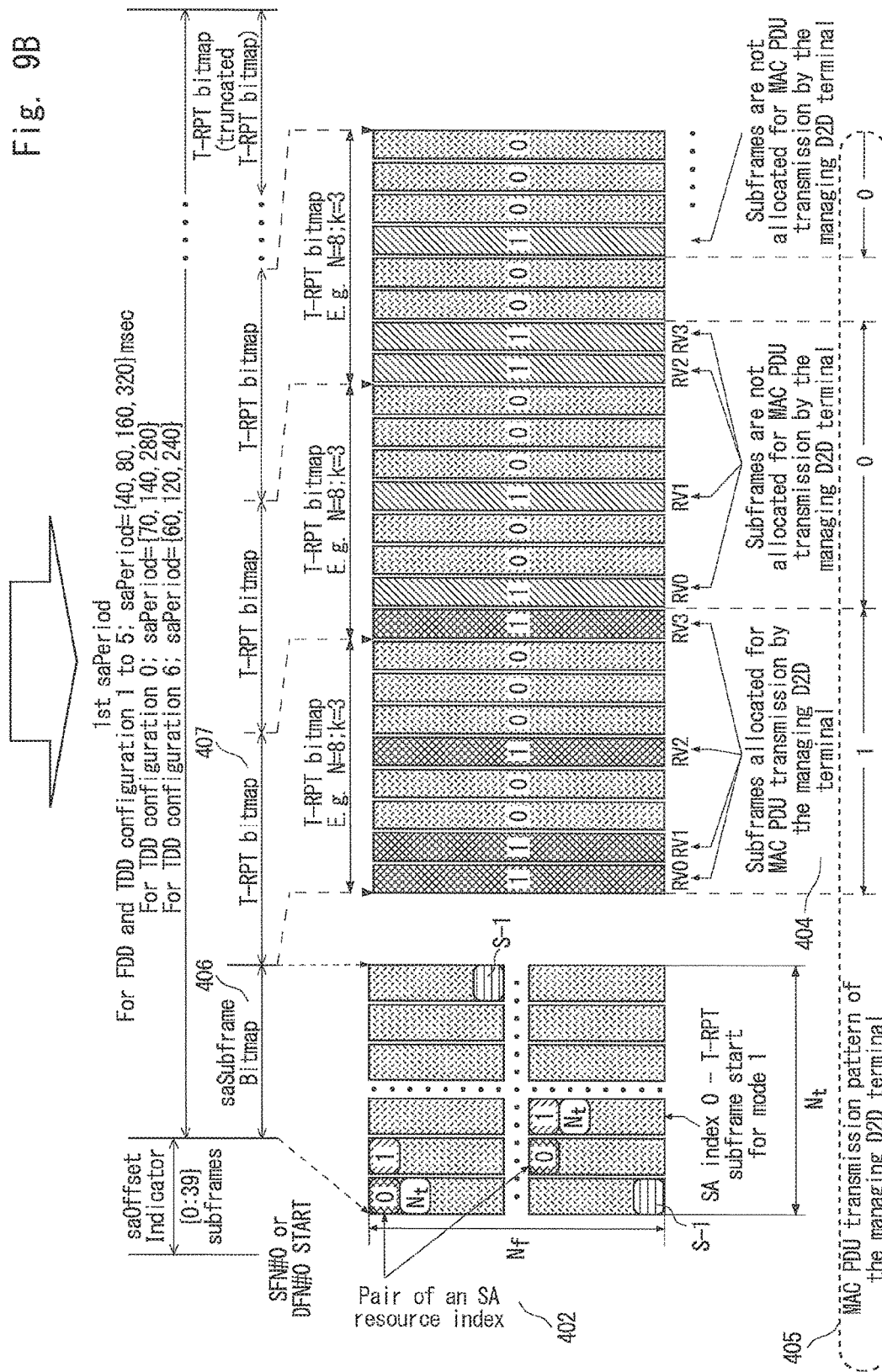
FIG. 9B illustrates a D2D communication system, according to an embodiment of the present invention.

FIG. 9A and FIG. 9B illustrate a device-to-device (D2D) communication system 400, according to an embodiment of the present invention. The system D2D communication system 400 includes a managing D2D-UE 401 and a managed D2D-UE 403, and illustrates basic managed D2D communication scenario, where an SA and MAC PDUs are transmitted by the managing D2D-UE 401.

The managing D2D-UE 401 selects an SA resource index, such as SA index #0, to transmit an SA 402 in an saSubframe 406 to the managed D2D-UE 403. The SA 402 provides a time resource pattern of transmission (T-RPT), frequency resource, timing adjustment (TA) and modulation coding scheme (MCS), for the reception and decoding of data in the form of MAC-PDUs 404 at the managed D2D-UE 403. The T-RPT bitmap 407 indicates the subframes that are allocated for MAC-PDU transmission by the managing D2D-UE. The MAC-PDUs 404 transmitted by the managing D2D-UE 401 are sent in a first transmission of an SA period (i.e. the period for which resources are allocated) that is associated with the T-RPT bitmap 407.

The managing D2D-UE 401 provides a MAC PDU transmission pattern 405 to indicate the mapping of its transmitted MAC-PDUs, which enables the managed D2D-UE 403 to receive and decode MAC-PDUs intended for it. The managing D2D-UE 401 utilises an 8-bit SA ID string to provide the MAC PDU transmission pattern 405 to the managed D2D-UE 402.

While one managed D2D-UE 403 is illustrated in FIG. 9A, the skilled addressee will readily appreciate that the system 400 may include several managed D2D-UEs 403.

Figure 10A:
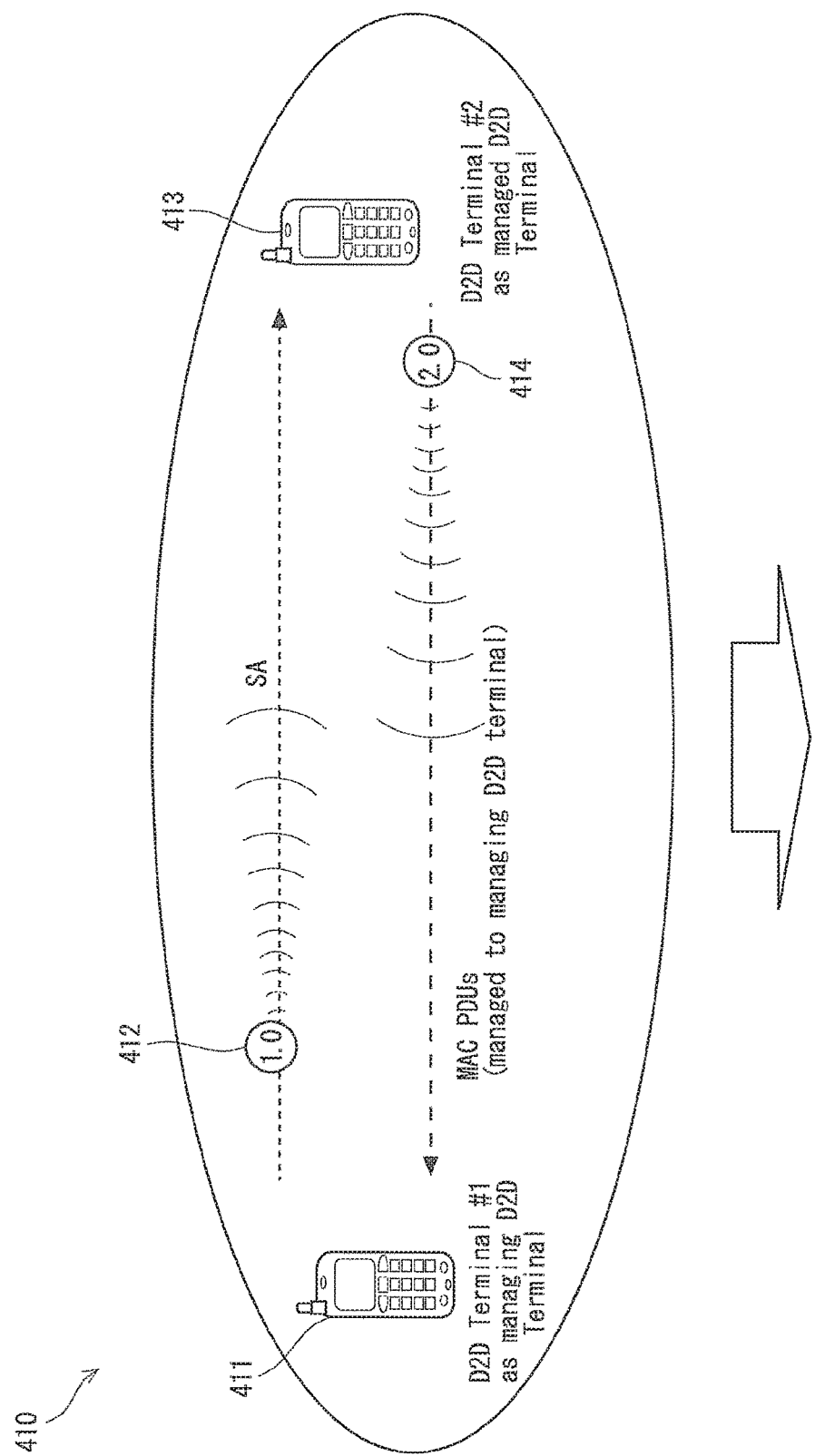
FIG. 10A illustrates a further D2D communication system, according to an embodiment of the present invention.
Figure 10B:
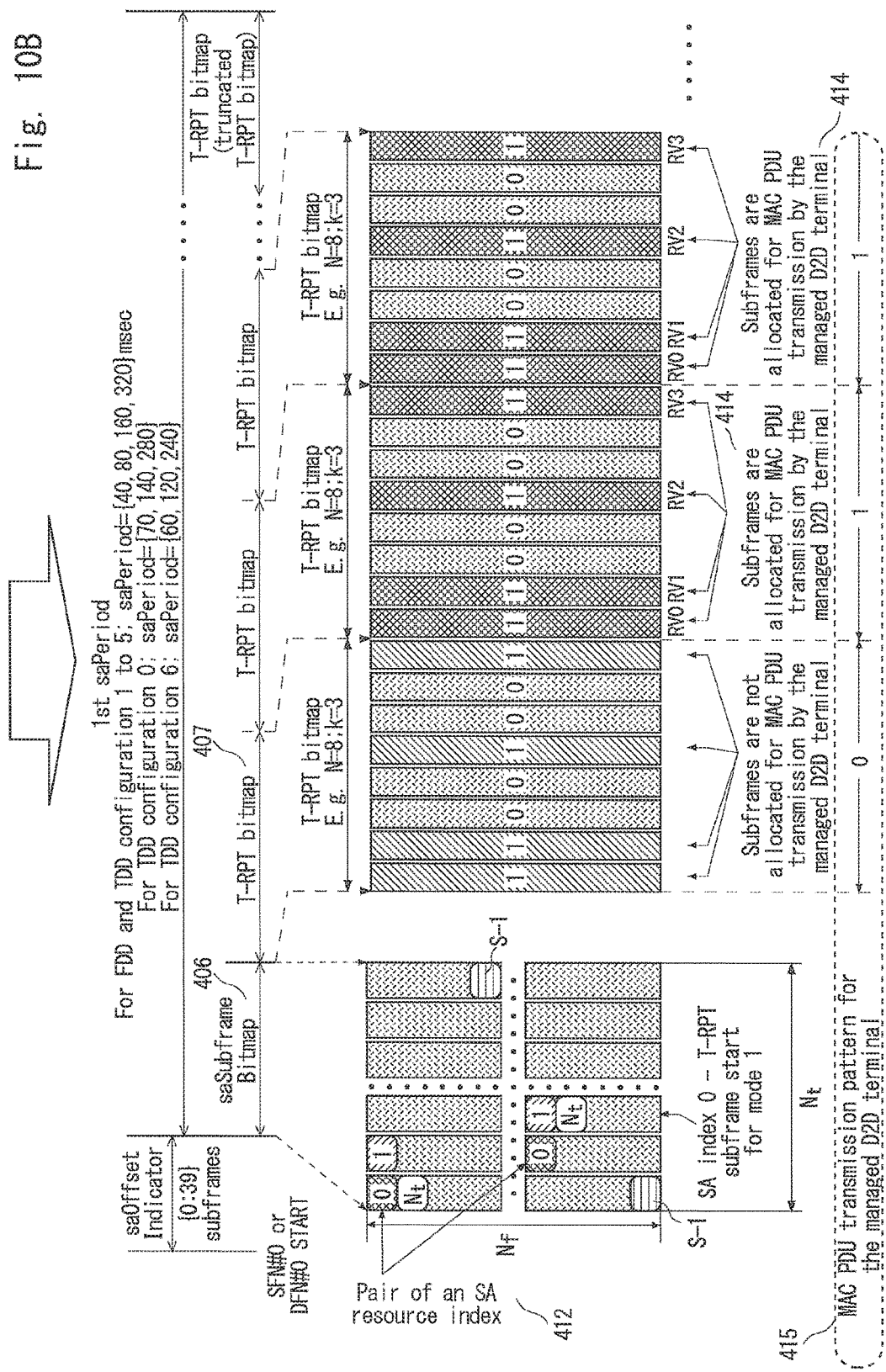
FIG. 10B illustrates a further D2D communication system, according to an embodiment of the present invention.

FIG. 10A and FIG. 10B illustrate a D2D communication system 410, according to an embodiment of the present invention. The D2D communication system 410 is similar to the D2D communication system 400 of FIG. 9A and FIG. 9B, however the SA is transmitted by a managing D2D-UE 411 and the MAC PDUs are transmitted by a managed D2D-UE 413. In particular, the managed D2D-UE 413 can only perform MAC-PDU transmission, on a predefined or reserved communication channel or range of communication channels, when it is authorised by the managing D2D-UE 411.

An authorisation signal may be periodically transmitted by the managing D2D-UE 411, providing control information including T-RPT, frequency resource index or index range, and MCS for the encoding, mapping and transmitting the MAC-PDUs from the managed D2D-UEs 413. The authorisation signal may be included entirely in an SA 412 in the form of physical layer indicator signal for a particular SA period. Alternatively, the authorisation signal may comprise a combination of SA (corresponding to the SA 402 in FIG. 9A and FIG. 9B) and the associated MAC-PDU (corresponding to the MAC-PDUs 404 in FIG. 9A and FIG. 9B). As such, the authorisation signal may appear in the form high layer signalling i.e. MAC or RLC signal, providing scheduling related information.

The managing D2D-UE 411 may utilise an SA ID bit string to indicate the MAC PDU transmission pattern 415 that is to be used by the managed D2D-UE 413. As such, a plurality of managed D2D-UEs 413 may each be provided with a distinct MAC PDU transmission pattern 415.

Figure 11A:
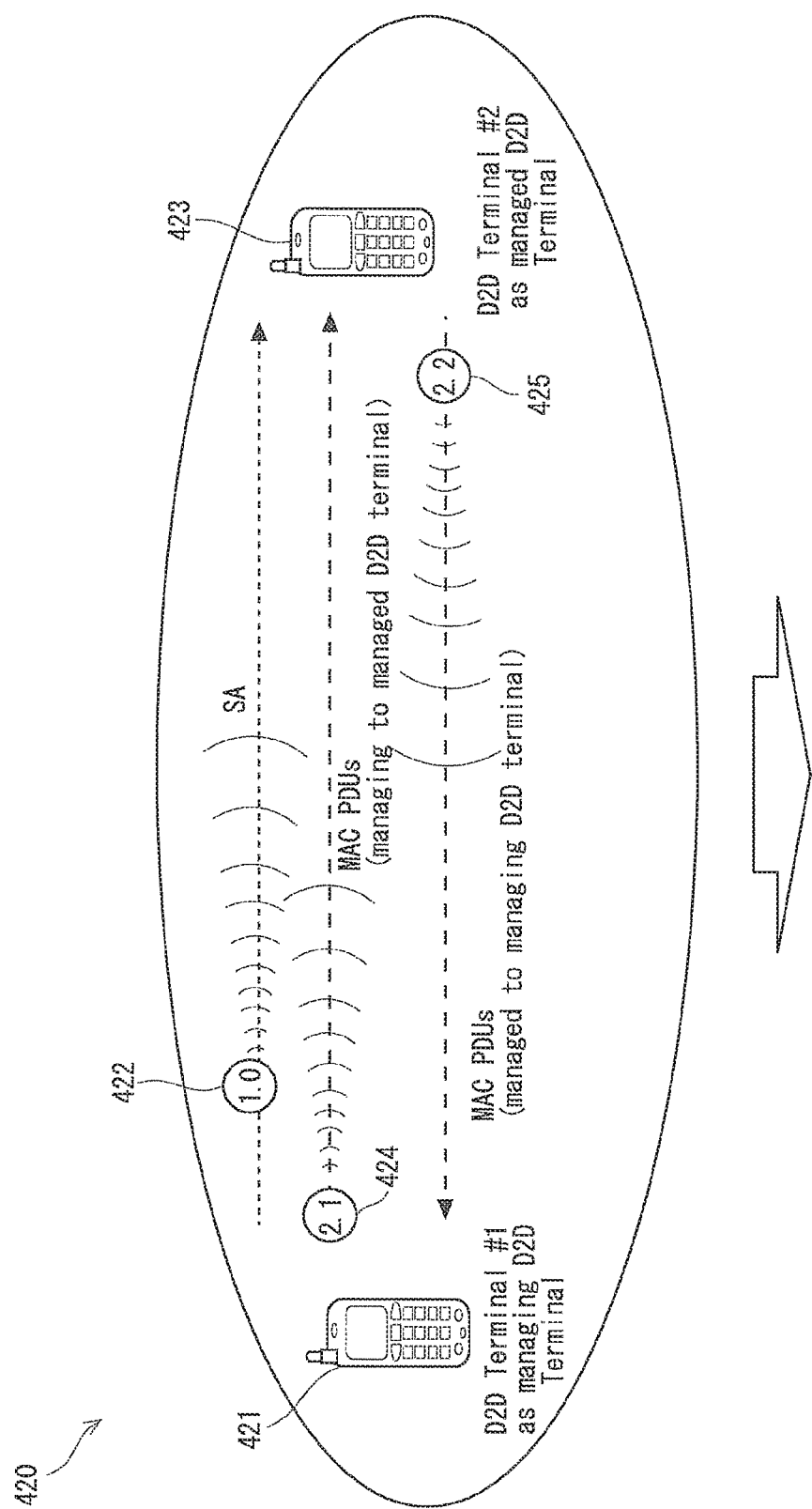
FIG. 11A illustrates a further D2D communication system, according to an embodiment of the present invention.
Figure 11B:
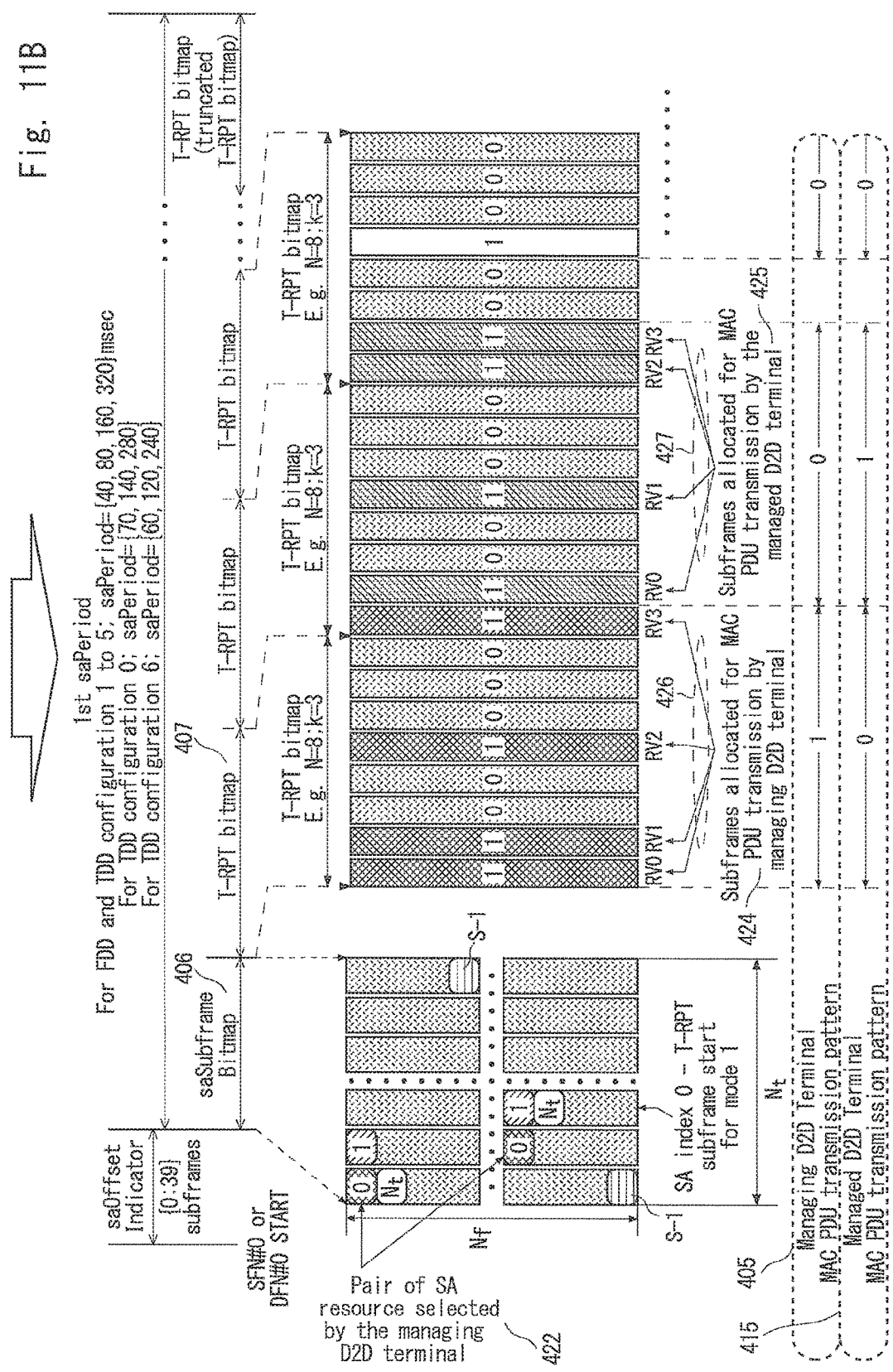
FIG. 11B illustrates a further D2D communication system, according to an embodiment of the present invention.

FIG. 11A and FIG. 11B illustrate a D2D communication system 420, according to an embodiment of the present invention. The D2D communication system 420 is similar to the D2D communication system 400 of FIG. 9A and FIG. 9B and the D2D communication system 410 of FIG. 10 A and FIG. 10B, however is configured to provide full duplexing communication in an SA period.

A managing D2D-UE 421 selects an SA resource index, e.g. SA index #0 to transmit an SA 422 that provides information for the reception and decoding of a subsequently transmitted MAC-PDUs 424, while further authorising a managed D2D-UE 423 to transmit MAC-PDUs 425 in the same SA period. The managing D2D-UE 421 may select the SA resource index randomly, according to predefined rules, or in any other suitable manner.

The managing D2D-UE 421 and the managed D2D-UE 423 may share the same T-RPT or T-RPTs in the SA period for transmitting and receiving the MAC-PDUs. The MAC-PDUs transmitted by the managing D2D-UE 421 and the MAC-PDU(s) transmitted by the managed D2D-UE 423 are time-multiplexed on a MAC-PDU basis, where the MAC-PDUs 424 transmitted by managing D2D-UE are always mapped on the first four (4) sub-frames 426 in a T-RPT and the remaining sub-frames 427 are allocated for MAC-PDUs transmitted by either the managing D2D-UE 421 or the managed D2D-UE 423. Either way, the transmitted MAC-PDUs follow the MAC-PDU transmission patterns 405, and 415 provided by the managing D2D-UE 421.

FIG. 12 A and FIG. 12B illustrate a D2D communication system 450, for providing managed D2D communication to realise full duplex communication in a private PPT voice call. The full duplex communication improves voice conversation user experience when compared to halt-duplex communication.

The first device 451 is used to enter a number of a second device 455, upon which a PTT button is pressed and held 452 to establish a connection with second device 455. An SA 453 transmitted by the first device 451 is used to reserve a forward channel 454 and a reverse channel 457 for voice packet transmission. A PTT button may be pressed and held 456 on the second device 455 to answer the call, and by continuing to hold the PTT button, voice packets 457 are sent on the T-RPT reserved by the SA 453.

The first device 451 is initially a managing D2D-UE, and the second device 455 is initially a managed D2D-UE. However, the managing and managed roles of the first and second devices 451, 455 can be seamlessly exchanged. For example, as the PTT button on the first device 451 is released while the PTT button on the second device 455 remains held, the second device 455 takes over the managing role to maintain the communication by periodically transmitting SA without user intervention, as illustrated in 450.a.

Figure 13:
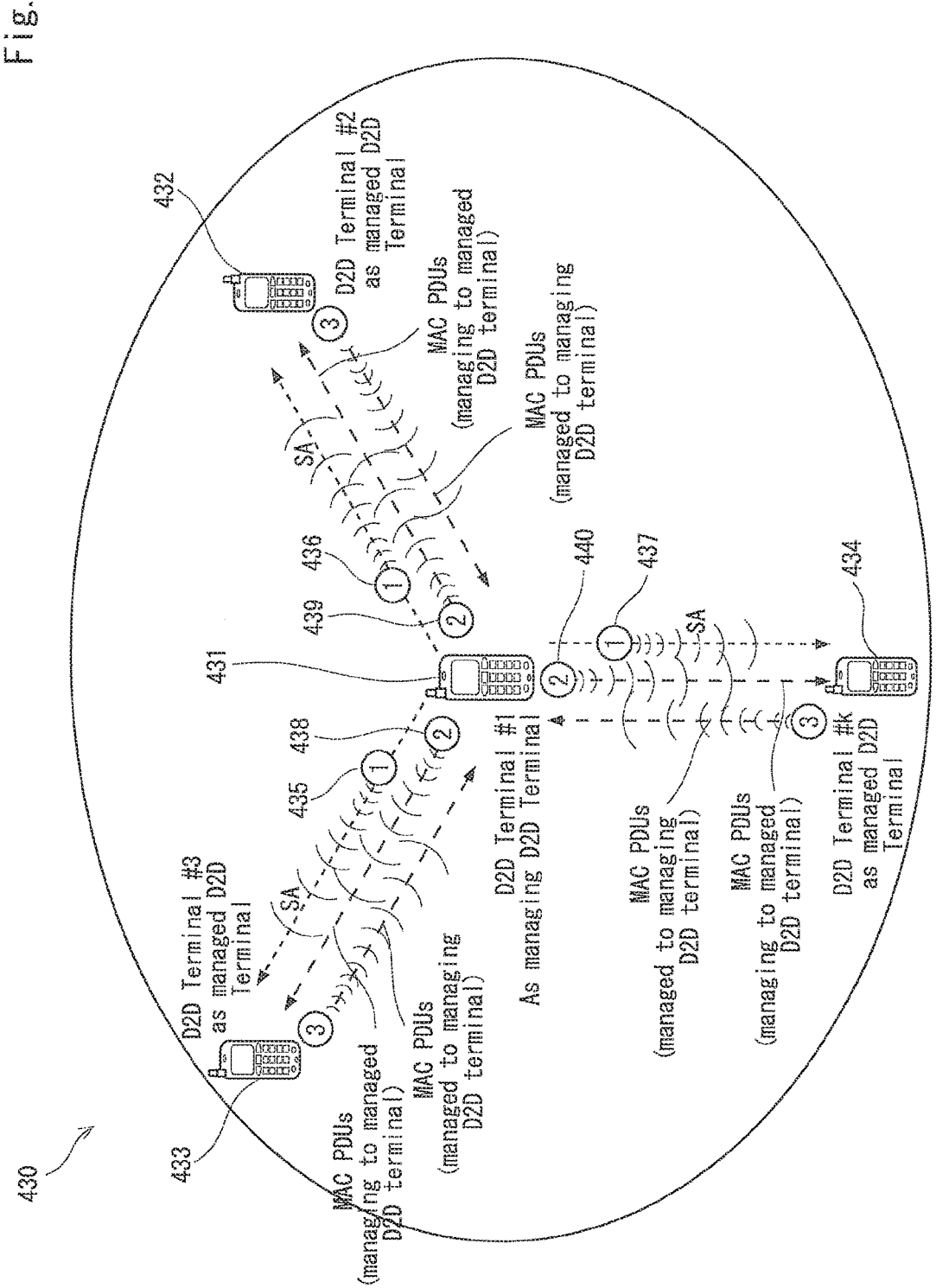
FIG. 13 illustrates a further D2D communication system, for providing managed D2D communication to realise efficient group scheduled communication among several D2D-UEs, according to an embodiment of the present invention.

FIG. 13 illustrates a D2D communication system 430, for providing managed D2D communication to realise efficient group scheduled communication among several D2D-UEs.

A managing D2D-UE 431 transmits multiple SAs 435, 436, 437 and associated MAC-PDUs 438, 439, 440 to different managed D2D-UEs 432, 433, 434 by selecting more than one SA resource index in an SA Period. The multiple SAs and associated MAC-PDUs are transmitted on a single T-RPT and the multiple MAC-PDUs transmitted by the managing D2D-UE 431 are frequency multiplexed. Alternatively, if there are insufficient frequency resources in a T-RPT for transmitting the MAC-PDUs, multiple non-overlapping T-RPTs can be used.

The managing D2D-UE 431 may also broadcast a single SA (i.e. SA 435=SA 436=SA 427) and associated MAC-PDU (i.e. MAC-PDU 438=MAC-PDU 439=MAC-PDU 440) to provide high layer configuration including scheduling related information for all managed D2D-UEs 432, 433, 434 to perform periodic report such as position reports. Upon the reception of the SA 435, 436, 437 and associated MAC-PDU 438, 439, 440, the managed D2D-UEs 432, 433, 434 may transmit MAC-PDUs according to the configuration provided by the managing D2D-UE 431 using the assigned T-RPT and allocated frequency resources, or self-derived frequency resources. For the managed D2D-UEs sharing the same T-RPT, the MAC-PDUs are frequency multiplexed to allow the managing D2D-UE 431 to simultaneously receiving MAC-PDUs from multiple managed D2D-UEs 432, 433, 434 to enabling receiver interference management.

FIG. 14A and FIG. 14B illustrate a D2D communication system 500, for providing managed D2D communication to realise a D2D repeater. In particular, a first D2D-UE 501 acts as repeater allowing second and third D2D-UEs 502, 503 that are out of range of each other to communicate with each other.

The first D2D-UE 501, the second D2D-UE 502 and third D2D-UE 503 are not under network coverage. The second D2D-UE 502 and the third D2D-UE 503 are, however, within transmission range with the first D2D-UE 501, but the second D2D-UE 502 and the third D2D-UE 503 are out of transmission range with each other. The out of range can be caused by distance separation and/or shadowing (i.e. shadow fading).

When being configured to operate in "repeater D2D" mode, the first D2D-UE 501 may establish two-way communication with the out-of-range second D2D-UE 502 and third D2D-UE 503 in the form of first and second managed D2D communication groups. The first managed D2D communication group includes the managing D2D-UE 501 and the managed D2D-UE 502. The second managed D2D communication group includes the managing D2D-UE 501 and the managed D2D-UE 503. In an SA period, the first D2D-UE 501 may configure the second D2D-UE 502 and the third D2D-UE 503 by providing control information in the form of two independent SA resource indexes. In particular, the first D2D-UE 501 may broadcast the SA and its associated MAC-PDUs 504 having configuration to the second D2D-UE 502, and the SA and its associated MAC-PDUs 505 having configuration to the third D2D-UE 503.

The first D2D-UE 501 may use the same T-RPT for mapping the MAC-PDUs 504 intended for the second D2D-UE 502 and the third D2D-UE 503. The first D2D-UE 501 may periodically broadcast the configuration 504 and 505 to allow late coming D2D-UEs (not illustrated) to utilise its "repeater D2D" mode services. On an SA-period basis, the first D2D-UE 501 may periodically broadcast the SA 506 to the first managed D2D group and/or the SA 507 to the second managed D2D group providing control information.

The control information can be used for the reception/decoding of the relayed MAC-PDUs 509, 511 and also comprises an authorisation signal for the managed D2D-UEs 502, 503 to transmit data, i.e. MAC-PDUs 508, 510, for being relayed.

In handling transmission of the relayed MAC-PDUs 511, 509 and reception of the MAC-PDUs 508, 510 for being relayed, the first D2D-UE 501 may perform multiplexing to improve latency and manage interference.

In particular, the same T-RPT may be used for simultaneously transmitting the relayed MAC-PDUs 511, 509 to the second D2D-UE 502 and third D2D-UE 503, where the MAC-PDUs 511 intended to the 2nd D2D-UE 502 and the MAC-PDUs 509 intended for the 3rd D2D-UE (503) are frequency multiplexed. Similarly, the same T-RPT may be used for simultaneously receiving the MAC-PDUs 508, 510 for being relayed from the second D2D-UE 502 and the third D2D-UE 503, where the MAC-PDUs 508 for being relayed from the second D2D-UE 502 and the MAC-PDUs 510 being relayed from the third D2D-UE 503 are frequency multiplexed.

The same T-RPT or non-overlapping T-RPTs may be used for transmitting the relayed MAC-PDUs 511 and receiving MAC-PDUs 508 for being relayed to and from the second D2D-UE 502, or for transmitting the relayed MAC-PDUs 509 and receiving MAC-PDUs 510 for being relayed to and from the third D2D-UE 503.

As such, full duplexing can be provided with low (1 SA period) latency.

FIG. 15 illustrates a D2D communication system 600, for providing managed D2D communication to realise a D2D network gateway. In particular, a first D2D-UE 620, which is under network coverage, provides network connectivity services to a plurality of second D2D-UEs 622, 623, 624 and 625 that are out of network coverage. As such, the second D2D-UEs 622, 623, 624 and 625 are able to communicate with a management centre 650, for example in providing periodic position reports, or to communicate with other D2D-UEs which are not within the transmission range but can be reached through the network. In MCC, the management centre 650 is generally the sub-system that administers and manages the MCC D2D-UEs 622, 623, 624 and 625.

The first D2D-UE 620 establishes a managed D2D group 621 where it functions as managing D2D-UE and the second D2D-UEs 622, 623, 624, 625 function as managed D2D-UEs that require network relay services periodically or on demand. The managing D2D-UE 620 applies a mode-2 resource pool configuration of the network 610 for transmission and/or reception of SAs and associated MAC-PDUs within the managed group. The managing D2D-UE 620 may further periodically broadcast MAC-PDUs carrying the mode-2 network resource pool configuration in the form of high layer signalling or application data to the managed D2D-UEs in its managed groups. By applying the mode-2 network resource pool configuration in its managed groups, the managing D2D-UE 620 can coordinate the D2D and cellular signal transmission/reception on a subframe basis without network/eNB intervention.

The managing D2D-UE 620 may use an SA-ID to differentiate periodically broadcasted MAC-PDUs carrying mode-2 network resource pool configurations with network originating relayed MAC-PDUs. As such, both current and incoming managed D2D-UEs may utilise its relayed services. Within the managed D2D group, the managed D2D-UEs 622, 623, 624, 625, cannot transmit MAC-PDUs for being relayed unless they are authorised by the group managing D2D-UE 620. For periodic relay service, when being configured, the managing D2D-UE 620 periodically broadcasts the authorisation signal on the SA 631 or a combination of the SA 631 and the MAC-PDUs 632 to provide schedule information 630 for the managed D2D-UEs 622, 623, 624 and 625 to transmit their MAC-PDUs for being relayed. The managing D2D-UE 620 may schedule the managed D2D-UEs to use the same T-RPT or non-overlapping T-RPT for transmitting their MAC-PDUs where the managed D2D-UEs' MAC-PDUs sharing the same T-RPT are frequency multiplexed for interference management at the managing D2D-UE 620 receiver.

According to certain embodiments, a "multi-watch" or "multi-channels monitoring/listening" D2D communication may be provided. In such case, the first D2D-UE may be under network coverage having capability to simultaneous monitor or listen to conversations of more than one D2D group and the cellular network. The first D2D-UE may have one primary speaker and an associated microphone, and one or more secondary speakers. The primary speaker and the associated microphone may be used by the first D2D-UE to actively participate in and control voice communication in a managed communication group, where the secondary speakers allow the first D2D-UE to monitor or listen to other D2D groups which may by MCPTT groups, managed D2D groups or cellular channel(s).

Embodiments of the present invention, described above, introduces managed or coordinated D2D communication, suitable for mission critical communication, where managed or coordinated D2D-UEs are restricted from transmitting unless they receive authorisation from a managing or coordinating D2D-UE.

The D2D-UE communication systems may include a D2D repeater or D2D network relay, and may enhance user experience in full duplex communication.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian provisional patent application No. 2015900449, filed on Feb. 12, 2015, the disclosure of which is incorporated herein in its entirety by reference.

REFERENCE SIGNS LIST 400, 410, 420, 430, 450, 500, 600 D2D communication system
401, 403, 411, 413, 421, 423, 431 to 434, 451, 455, 501 to 503, 620, 622 to 625 D2D-UE

The invention claimed is:

1. A method of device-to-device (D2D) communication, the method including: providing, from a first D2D-UE to at least one second D2D-UE, a scheduling configuration, wherein the first D2D-UE and the at least one second D2D-UE form a managed D2D group; and
providing, from the first D2D-UE to the at least one second D2D-UE, data according to the scheduling configuration, wherein the method further includes selectively authorizing the at least one second D2D-UE to transmit data on the reserved channel.

2. The method according to claim 1, where the reserved channel is defined at least in part according to a scheduling assignment (SA) resource index of the scheduling configuration.

3. The method according to claim 1, wherein the scheduling configuration is provided at least in part as a scheduling assignment (SA).

4. The method according to claim 1, wherein the first D2D-UE authorizes a second D2D-UE of the at least one second D2D-UE to transmit data on a Time Resource Pattern of Transmission (T-RPT) on which the first D2D-UE transmits data to the second D2D-UE.

5. The method according to claim 4, wherein full duplex communication is provided between the first D2D-UE and the second D2D-UE on the reserved channel.

6. The method according to claim 4, wherein the at least one second D2D-UE comprises a plurality of D2D-UE's, and the first D2D-UE authorizes the plurality of D2D-UEs to transmit data on the T-RPT on which the first D2D-UE transmits data to the plurality of D2D-UES.

7. The method according to claim 6, wherein the first D2D-UE authorizes the plurality of D2D-UEs to transmit data by providing transmission patterns to the plurality of D2D-UEs, wherein transmission patterns are provided in an SA, and an SA-ID field of a provided SA is used to identify a D2D-UE of the more than one D2D-UE for which the transmission patterns are intended.

8. The method according to claim 7, further including providing frequency resource indexes to the plurality of D2D-UEs to manage frequency domain interference at the first D2D-UE.

9. The method according to claim 1, further including providing mission critical push-to-talk (MCPTT) between the first D2D-UE and the at least one second D2D-UE.

10. The method according to claim 1, wherein the first D2D-UE is configured to operate as a repeater, allowing one D2D-UE of the at least one second D2D-UE and an other D2D-UE of the at least one second D2D-UE to communicate with each other.

11. The method according to claim 10, further including establishing a first managed D2D group comprising the first D2D-UE and the one D2D-UE, and a second managed D2D group comprising the first D2D-UE and the other D2D-UE.

12. The method according to claim 10, wherein a T-RPT is used for simultaneous transmission and reception of data between the first D2D-UE and the at least one second D2D-UE.

13. The method according to claim 12, wherein the data from different second D2D-UEs is frequency multiplexed.

14. The method according to claim 13, wherein the data comprises Medium Access Control-Protocol Data Units (MAC-PDUs), and an SA-ID is used to differentiate MAC-PDUs transmitted to the one D2D-UE with the MAC-PDUs transmitted to the other D2D-UE.

15. The method according to claim 1, when the first D2D-UE is configured to operate as a network relay to the at least one second D2D-UE, to provide network connectivity to the at least one second D2D-UE.

16. The method according to claim 15, wherein the scheduling configuration comprises a resource pool configuration that is configured by a base station that provides network coverage to the first D2D-UE.

17. The method according to claim 15, wherein the at least one second D2D-UE is able to communicate with a management center that administers the at least one second D2D-UE in an MCC system by the provided network gateway node.

18. A device-to-device (D2D) communication system, the system including: a first D2D-UE that is configured to:
provide to the at least one second D2D-UE, a scheduling configuration, wherein the first D2D-UE and the at least one second D2D-UE form a managed D2D group; and
provide to the at least one second D2D-UE, data according to the scheduling configuration: transmit data on a reserved channel of the scheduling configuration; and selectively authorize the at least one second D2D-UE to transmit data on the reserved channel.

* * * * *